(12) United States Patent
Maeno et al.

(10) Patent No.: US 10,120,070 B2
(45) Date of Patent: Nov. 6, 2018

(54) DETECTION DEVICE, RADAR DEVICE, DETECTION METHOD, AND DETECTION PROGRAM

(71) Applicant: FURUNO ELECTRIC CO., LTD., Nishinomiya, Hyogo (JP)

(72) Inventors: Hitoshi Maeno, Nishinomiya (JP); Sae Takemoto, Nishinomiya (JP); Akira Okunishi, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 402 days.

(21) Appl. No.: 14/773,572

(22) PCT Filed: Mar. 11, 2014

(86) PCT No.: PCT/JP2014/056236
§ 371 (c)(1),
(2) Date: Sep. 8, 2015

(87) PCT Pub. No.: WO2014/142087
PCT Pub. Date: Sep. 18, 2014

(65) Prior Publication Data
US 2016/0018518 A1 Jan. 21, 2016

(30) Foreign Application Priority Data
Mar. 12, 2013 (JP) .................. 2013-048782

(51) Int. Cl.
*G01S 7/292* (2006.01)
*G01S 13/524* (2006.01)
*G01S 13/53* (2006.01)

(52) U.S. Cl.
CPC .......... *G01S 13/5246* (2013.01); *G01S 7/292* (2013.01); *G01S 13/53* (2013.01)

(58) Field of Classification Search
CPC .... G01S 13/5246; G01S 13/52; G01S 13/524; G01S 13/53; G01S 13/534; G01S 13/538;
(Continued)

(56) References Cited

U.S. PATENT DOCUMENTS 5,485,157 A * 1/1996 Long ..................... G01S 7/2927
 342/159
5,499,030 A * 3/1996 Wicks ..................... G01S 7/292
 342/159
(Continued)

FOREIGN PATENT DOCUMENTS

JP 62-148873 A 7/1987
JP 63-145978 A 6/1988
(Continued)

OTHER PUBLICATIONS

International Search Report of the corresponding International Application No. PCT/JP2014/056236, dated Jun. 17, 2014.

*Primary Examiner* — Timothy A Brainard
*Assistant Examiner* — Daniel P Malley, Sr.
(74) *Attorney, Agent, or Firm* — Studebaker & Brackett PC

(57) ABSTRACT

A detection device detects a target based on a reception signal obtained from a reflection signal of a transmission signal. The detection device includes a Doppler frequency component generator that acquires a Doppler frequency component that indicates the amplitude level of a reception signal, for at least one Doppler frequency, based on the reception signal, a region identifier that identifies a first region and a second region that is outside the first region, based on the value of the amplitude level and the increase rate in the amplitude level, a second-Doppler frequency component suppressor that suppresses the Doppler frequency component of an unnecessary signal, out of the Doppler frequency component corresponding to the second
(Continued)

region, and a combiner that combines the Doppler frequency component corresponding to the first region outputted from the region identifier, and the output of the second Doppler frequency component suppressor.

20 Claims, 19 Drawing Sheets

(58) Field of Classification Search
CPC ...... G01S 7/292; G01S 7/2921; G01S 7/2922; G01S 7/2927; G01S 7/41; G01S 7/414; G01S 7/415; G01S 7/487; G01S 7/4873; G01S 7/4876

See application file for complete search history.

(56) References Cited

U.S. PATENT DOCUMENTS

| | | | |
|---|---|---|---|
| 5,748,142 A * | 5/1998 | Rademacher | G01S 7/023 342/159 |
| 5,798,728 A | 8/1998 | Tomishima et al. | |
| 2010/0207809 A1 * | 8/2010 | Fujikawa | G01S 7/414 342/26 R |
| 2010/0321231 A1 * | 12/2010 | Nakahama | G01S 7/062 342/118 |
| 2012/0007767 A1 * | 1/2012 | Maeno | G01S 7/2927 342/92 |
| 2013/0038479 A1 | 2/2013 | Eldar et al. | |
| 2014/0062760 A1 * | 3/2014 | Asada | G01S 13/5242 342/107 |

FOREIGN PATENT DOCUMENTS

| | | |
|---|---|---|
| JP | 02-296173 A | 12/1990 |
| JP | 03-248077 A | 11/1991 |
| JP | 08-110377 A | 4/1996 |
| JP | 09-145829 A | 6/1997 |
| JP | 10-260247 A | 9/1998 |
| JP | 2000-230972 A | 8/2000 |
| JP | 2001-091644 A | 4/2001 |
| JP | 2012-154887 A | 8/2012 |
| JP | 2014-006067 A | 1/2014 |
| JP | 2014-006069 A | 1/2014 |
| JP | 2014-029284 A | 2/2014 |
| JP | 2014-052214 A | 3/2014 |

* cited by examiner

DETECTION DEVICE, RADAR DEVICE, DETECTION METHOD, AND DETECTION PROGRAM

CROSS REFERENCE TO RELATED APPLICATIONS

This application is a U.S. National stage of International Application No. PCT/JP2014/056236 filed on Mar. 11, 2014. This application claims priority to Japanese Patent Application No. 2013-048782 filed on Mar. 12, 2013. The entire disclosure of Japanese Patent Application No. 2013-048782 is hereby incorporated herein by reference.

BACKGROUND

Field of the Invention

The present invention relates to a detection device that transmits pulsed detection signals, and generates target detection data from the reception signal produced by reflection from the target. In particular, the present invention relates to a detection device that uses Doppler processing to generate target detection data.

Background Information

Various kinds of the pulse Doppler radar discussed in Japanese Laid-Open Patent Application Publication No. 2001-91644 have been conceived. With this pulse Doppler radar, for example, processing is executed so that the frequency component of a target object, such as moving body that is moving at a specific relative speed, is not suppressed, but other frequency components are suppressed. This yields target detection data for just the target object.

Also, so-called CFAR (constant false alarm rate) processing has been used in the past to suppress clutter. With CFAR processing, the moving average deviations of the reception signal are calculated, and the moving average deviations are subtracted from the reception signal. This suppresses clutter in which the amplitude (strength) of reception signals is high on average over a wide range, and does not suppress a target object where the amplitude (strength) of a reception signal is locally high.

SUMMARY

However, when CFAR processing is performed with the above-mentioned pulse Doppler radar, large targets such as landmasses that have a high average amplitude (strength) of the reception signal over a wide range also end up being suppressed.

It is therefore an object of the present invention to provide a detection device with which large targets are not suppressed.

This invention relates to a detection device for detecting a target based on a reception signal obtained from a reflection signal of a transmission signal, and has the following characteristics. The detection device comprises a Doppler frequency component generator, a region identifier, a second Doppler frequency component suppressor, and a combiner. The Doppler frequency component generator acquires a Doppler frequency component that indicates the amplitude level of a reception signal, for at least one Doppler frequency, based on the reception signal. The region identifier identifies a first region and a second region that is outside the first region, based on the value of the amplitude level and the increase rate in the amplitude level. The second Doppler frequency component suppressor suppresses the Doppler frequency component of an unnecessary signal, out of the Doppler frequency component corresponding to the second region. The combiner combines the Doppler frequency component corresponding to the first region outputted from the region identifier, and the output of the second Doppler frequency component suppressor.

With this configuration, the region identifier can reliably identify the second region, in which suppression processing is necessary, and the first region, in which the suppression processing performed in the second region should not be performed. Using the region identification result produced by this region identifier allows the unnecessary signal component that is included in the reception signal of the second region and should be suppressed to be suppressed, without unnecessarily suppressing the reception signal in the first region (which should not be suppressed).

The detection device of this invention also comprises a first Doppler frequency component suppressor for suppressing the Doppler frequency component corresponding to the first region less than the suppression in the second region. The combiner combines the output of the first Doppler frequency component suppressor with the output of the second Doppler frequency component suppressor.

With this configuration, an example is given of the configuration for realizing the specific processing of the Doppler frequency component in the first region. This configuration prevents the Doppler frequency component in the first region from being unnecessarily suppressed.

Also, with the detection device of this invention, the region identifier detects the position where the increase rate in the amplitude level of the Doppler frequency component is at least a specific value, and if the amplitude level is at least a predetermined value over a specific range farther away from the position or from a nearby position, the position is detected as a first near end position where the first region and the second region are identified.

With this configuration, the near end position of the first region where the first region and the second region are identified can be reliably detected.

Also, with the detection device of this invention, the region identifier has a first region detector that comprises a first filter and a second filter having mutually different time constants, and that detects the end of the first region based on the difference value between the output levels of the first filter and the second filter for the Doppler frequency component.

With this configuration, the detection of the near end position is indicated more specifically, and this configuration allows the near end position to be detected more reliably.

Also, the Doppler frequency component suppressor of the detection device of this invention has a CFAR processor for performing CFAR processing on the value of the Doppler frequency component.

With this configuration, a specific example of suppression processing is given, and using this suppression processing allows the unnecessary signal component that is to be suppressed to be reliably suppressed.

Also, with the detection device of this invention, the region identifier detects the far end position of the first region by comparing the amplitude level of the Doppler frequency component to the amplitude level of the Doppler frequency component at the near end position.

With this configuration, the far end position of the first region can be reliably detected.

Also, with the detection device of this invention, the Doppler frequency component consists of a plurality of components.

With this configuration, more precise suppression processing and suppression avoidance processing can be performed.

Also, with the detection device of this invention, the region identifier assigns the first region to the first Doppler frequency component suppressor. The first Doppler frequency component suppressor performs first suppression processing on the Doppler frequency component in the first region from the region identifier. The second Doppler frequency component suppressor performs second suppression processing on the Doppler frequency component in the entire region. The combiner combines the Doppler frequency component that has undergone the first suppression processing and the Doppler frequency component that has undergone the second suppression processing, so as to select the Doppler frequency component that has undergone the first suppression processing for the first region.

Also, the detection device of this invention comprises a suppression processor having a first Doppler frequency component suppressor and a second Doppler frequency component suppressor for each Doppler frequency component. Each of the suppression processors performs first suppression processing in the first region, and performs second suppression processing in the second region.

Also, the detection device of this invention comprises a suppression processor with a region identification function, the suppression processor having a region identifier, a first Doppler frequency component suppressor, and a second Doppler frequency component suppressor, for each Doppler frequency component. Each suppression processor with a region identification function performs identification of the first region and the second region individually, performs first suppression processing in the first region, and performs second suppression processing in the second region.

Also, the detection device of this invention comprises a suppression processor with a region identification function, the suppression processor having a region identifier, a first Doppler frequency component suppressor, and a second Doppler frequency component suppressor, for a particular Doppler frequency component. There is also provided a second Doppler frequency component suppressor for Doppler frequency components other than the particular Doppler frequency component.

Also, the detection device of this invention comprises a suppression processor having a first Doppler frequency component suppressor and a second Doppler frequency component suppressor, for a particular Doppler frequency component. There is provided a second Doppler frequency component suppressor for Doppler frequency components other than the particular Doppler frequency component.

With this configuration, a specific example of the detection device configuration is given.

Also, the radar device of this invention comprises an antenna that rotates at a specific rotation period, a transmitter for transmitting a detection signal from the antenna to the outside at a repetition period that is shorter than the rotation period, and a detection device that receives as a reflection signal the signal received by the antenna from the outside.

With this configuration, radar detection performance is improved because the above-mentioned detection device is used.

With this invention, a detection image can be formed in which clutter is suppressed while moving bodies or large targets such as landmasses are not suppressed.

DETAILED DESCRIPTION OF EMBODIMENTS

The detection device 1 pertaining to a first embodiment of the present invention will now be described through reference to the drawings. The detection device in this embodiment and in the embodiments discussed below can be applied to a radar device or a scanning sonar. It can also be applied to other devices that transmit detection signals to detection regions, receive reflection signals from targets and so forth within the detection region as a polar coordinate system, produce echo data, and produce detection image data from the echo data.

Figure 1:
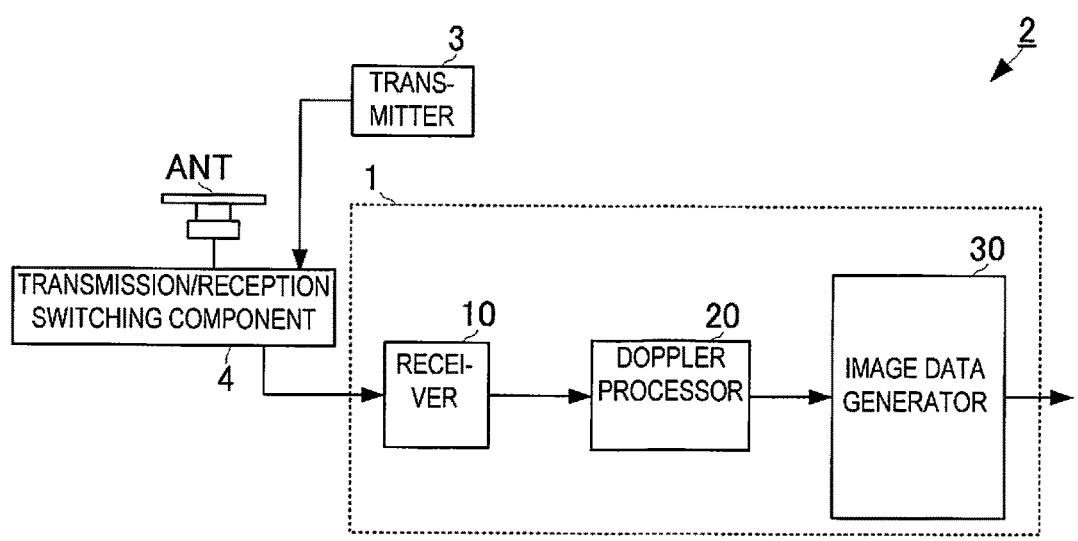
FIG. 1 is a block diagram of the configuration of a radar device that includes the detection device pertaining to a first embodiment of the present invention.

FIG. 1 is a block diagram of the configuration of a radar device 2 that includes the detection device 1 pertaining to the first embodiment of the present invention. The radar device 2 comprises the detection device 1, a transmitter 3, a transmission/reception switching component 4, and an antenna ANT.

The transmitter 3 sequentially outputs detection signals at a repetition period set according to the bearing resolution (1/PRF (repetition frequency of transmission)). The detection signals are made up of pulse burst signals composed of a specific pulse length and height. The pulse length and pulse height are set according to the distance resolution, the detection distance, etc. The detection signals are supplied through the transmission/reception switching component 4 to the antenna ANT.

The antenna ANT is installed at a specific location on a ship, and rotates at a period (scan period) that is sufficiently longer than the repetition period (1/PRF), while sending detection signals (detection waves) to the outside (detection region). The antenna ANT receives reflected waves obtained when detection waves are reflected by a target within the detection range (such as a moving target that moves at high speed, or a large target such as land), the sea surface, etc. The antenna ANT outputs reception signals via the transmission/reception switching component 4 to the detection device 1. Here, the antenna ANT outputs sweep angle data indicating the transmission or reception direction to the detection device 1 along with the reception signals.

The detection device 1 comprises a receiver 10, a Doppler processor 20, and an image data generator 30.

Figure 2:
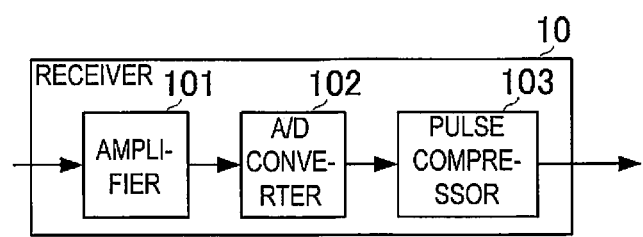
FIG. 2 is a block diagram of the configuration of a receiver in the detection device pertaining to the first embodiment of the present invention.

FIG. 2 is a block diagram of the configuration of the receiver 10. The receiver 10 comprises an amplifier 101, an A/D converter 102, and a pulse compressor 103. The amplifier 101 amplifies reception signals by AGC (auto gain control) or the like, and outputs them to the A/D converter 102. The A/D converter 102 samples the reception signals, which are analog signals, at a specific sampling frequency fs, produces echo data, which is digital data, and outputs this to the pulse compressor 103. The echo data consists of data values corresponding to the amplitude of the reception signals, arranged discretely on a time axis. The pulse compressor 103 performs processing to reduce the pulse width of reception signals by a known method. The pulse compressor 103 can also be omitted. The pulse compressor 103 is used when a frequency modulated pulse is used for a detection signal, and the pulse compressor 103 is not used when an unmodulated pulse is used for a detection signal. The echo data that has undergone this pulse compression processing is outputted to the Doppler processor 20 as sweep data in which a single data group corresponds to one sweep. Here, "sweep data from one sweep" means an echo data group obtained from a reception signal produced by a single detection signal.

The specific configuration and processing of the Doppler processor 20 will be discussed below, but this processor resolves a plurality of sets of sweep data composed of sweep data from a noted sweep that includes a noted position, and sweep data from near the noted sweep, into a plurality of Doppler frequency components. The Doppler processor 20 uses a plurality of Doppler frequency components to perform CFAR processing. Consequently, the sweep data from the noted sweep is revised so that clutter and other such echoes are suppressed and only the echo of the moving target remains.

Furthermore, the Doppler processor 20 detects the echoes of land and other large targets that end up being suppressed in CFAR processing. In other words, the Doppler processor 20 performs region identification processing. The Doppler processor 20 revises the sweep data so that the echo of a large target will remain, for a noted sweep in which the echo of this large target is present. Thus, the Doppler processor 20 performs different processing on the sweep data in the region of a large target and in other regions. The sweep data for the noted sweep after Doppler processing is outputted to the image data generator 30. The image data generator 30 produces detection image data by a known method.

Figure 3:
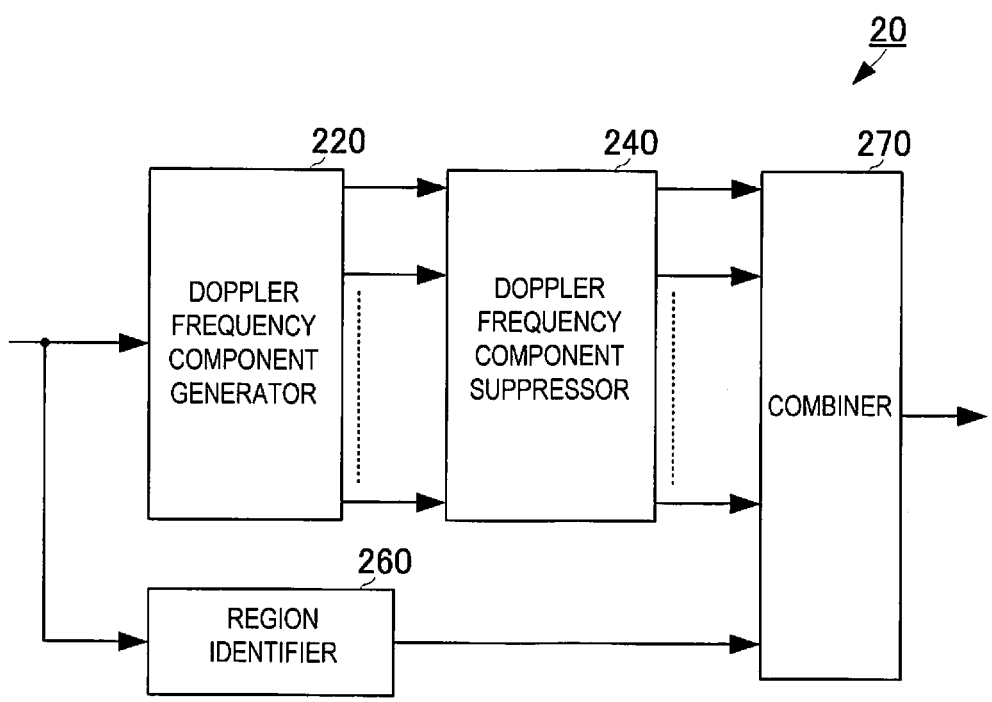
FIG. 3 is a block diagram of the configuration of a Doppler processor in the detection device pertaining to the first embodiment of the present invention.

The specific configuration and processing of the Doppler processor 20 will now be described. FIG. 3 is a block diagram of the configuration of the Doppler processor 20.

The Doppler processor 20 comprises a Doppler frequency component generator 220, a Doppler frequency component suppressor 240, a region identifier 260, and a combiner 270. The Doppler frequency component generator 220 generates the Doppler frequency component for a noted position. More specifically, the Doppler frequency component generator 220 acquires a plurality of sets of sweep data composed of sweep data for a noted sweep that includes a noted position, and sweep data from near the noted sweep. The Doppler frequency component generator 220 performs Fourier transform from these sets of sweep data to resolve echo data for the noted position of the noted sweep into a plurality of Doppler frequency components. The Doppler frequency component generator 220 outputs the Doppler frequency components thus generated to the Doppler frequency component suppressor 240.

The Doppler frequency component suppressor 240 performs CFAR processing, etc., to suppress unnecessary signal components included in the various Doppler frequency components. With this CFAR processing, echoes produced by clutter are included in the unnecessary signal components, but echoes produced by large targets also end up being included. Therefore, the echoes of small targets such as moving bodies remain in the data outputted from the Doppler frequency component suppressor 240. The Doppler frequency component suppressor 240 outputs data that has undergone suppression processing to the combiner 270. Thus, the Doppler frequency component suppressor 240 in this embodiment functions as the "second Doppler frequency component suppressor" of the present invention.

The region identifier 260 uses the method discussed below to identify the region of a large target (corresponds to the "first region" of the present invention) and other regions.

The region identifier 260 comprises an operation unit and a first filter and a second filter having mutually different time constants. The first filter and second filter are low-pass filters with different characteristics, for example. The first filter filters echo data and outputs first filter data F1OUT. The first filter data F1OUT is a waveform that corresponds to the time constant (response speed) of the first filter. The second filter filters echo data and outputs second filter data F2OUT. The second filter data F2OUT is a waveform that corresponds to the time constant (response speed) of the second filter.

The first filter data F1OUT and the second filter data F2OUT are inputted to the operation unit. The operation unit detects large targets by utilizing the fact that the waveform of the first filter data and the waveform of the second filter data differ according to the type of target.

Figure 4A:
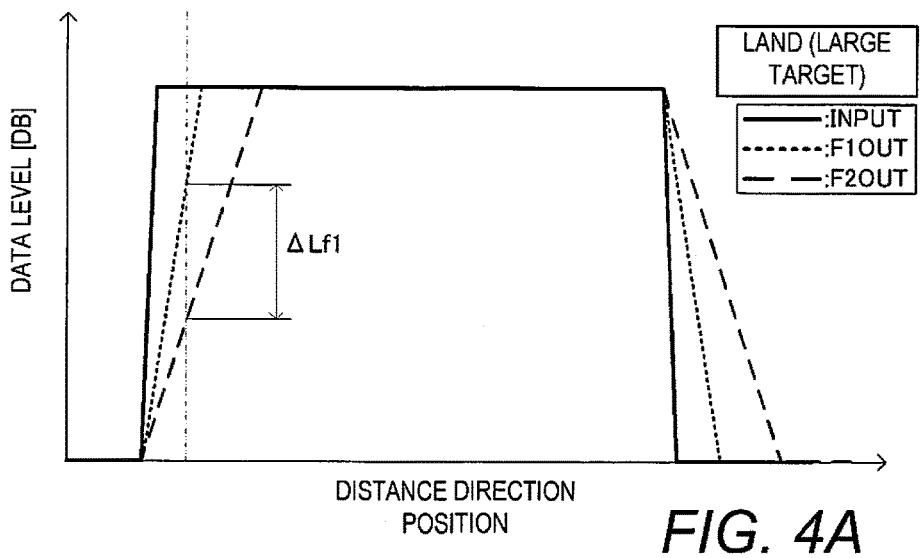
FIGS. 4A, 4B and 4C are graphs of the change in the echo data values in a single sweep and the change in the echo data values after filtering.
Figure 4B:
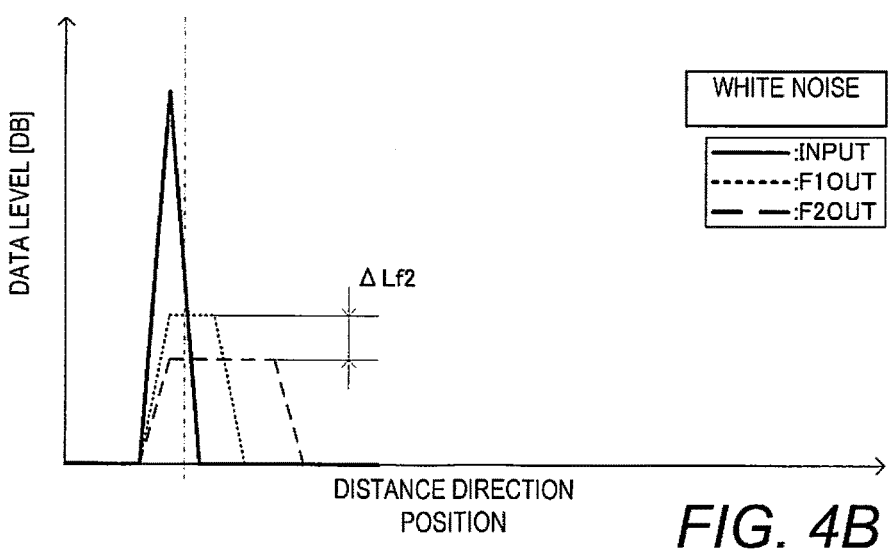
Figure 4C:
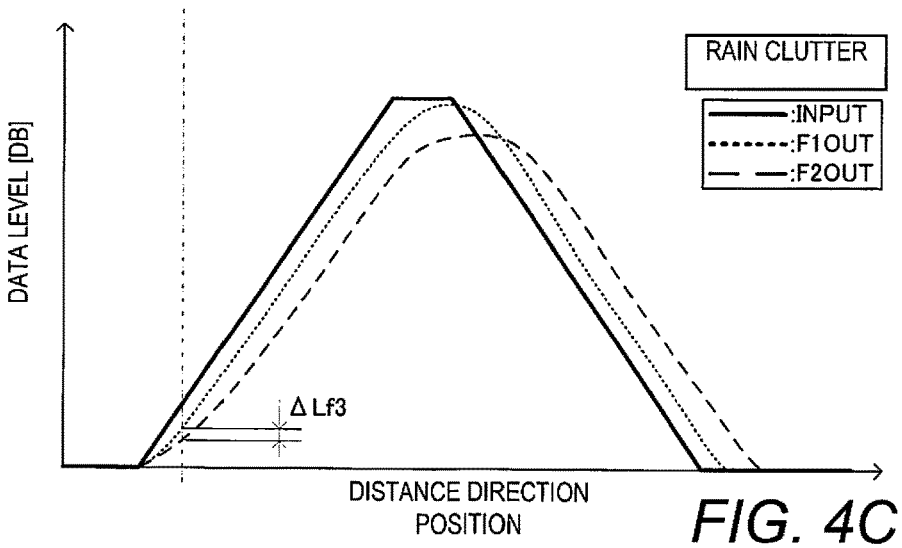

FIGS. 4A, 4B and 4C are graphs of the change in the echo data values in a single sweep and the change in the echo data values after filtering. FIG. 4A is for a large target, FIG. 4B is for a small moving body such as a moving ship, and FIG. 4C is for clutter (rain clutter).

As shown in FIG. 4A, with a large target, the sweep data values rise sharply, the data values hold steady at a high level for a period corresponding to the length in the distance direction of the large target, and then drop off sharply. In this case, the value of the sweep data outputted from the first filter increases while lagging according to the time constant of the first filter, after which the data value remains high for a while. The value of the sweep data outputted from the second filter increases while lagging according to the time constant of the second filter, after which the data value remains high for a while. Here, the second filter data F2OUT outputted from the second filter has a slower rise rate than the first filter data F1OUT outputted from the first filter.

Therefore, as shown in FIG. 4A, during the period until the sweep data outputted from the two filters reaches a stable data value after a specific length of time since the rise of the sweep data, there is a greater difference $\Delta Lf1$ between the value of the sweep data outputted from the first filter and the value of the sweep data outputted from the second filter.

As shown in FIG. 4B, in the case of a small moving body, the data value of the sweep data rises sharply and then sharply drops off right away. In this case, the data value for the sweep data outputted from the first filter increases while lagging according to the time constant of the first filter, peaks for an extremely short time according to the length in the distance direction of the moving body, and does not go very high. The data value for the sweep data outputted from the second filter increases while lagging according to the time constant of the second filter, peaks for an extremely short time according to the length in the distance direction of the moving body, and does not go very high. Here, the second filter data F2OUT outputted from the second filter has a slower rise rate than the first filter data F1OUT outputted from the first filter, but since the length of time during which the data value rises is short, the data value that is reached does not change as much as with a large target.

Therefore, as shown in FIG. 4B, after a specific length of time since the rise of the sweep data, the difference $\Delta Lf2$ between the value of the sweep data outputted from the first filter and the value of the sweep data outputted from the second filter is less than the difference $\Delta Lf1$ in the case of a large target. Specifically, $\Delta Lf1 > \Delta Lf2$.

As shown in FIG. 4C, in the case of clutter, the data value for the sweep data increases gradually and decreases gradually. In this case, the data value for the sweep data outputted from the first filter increases while lagging according to the time constant of the first filter. The data value for the sweep data outputted from the second filter increases while lagging according to the time constant of the second filter. Here, the sweep data outputted from the second filter has a slower rise rate than the sweep data outputted from the first filter. However, since the rise of the inputted sweep data is gradual, the first filter data F1OUT outputted from the first filter is also gradually, just like the rise of the second filter data F2OUT outputted from the second filter.

Therefore, as shown in FIG. 4C, after a specific length of time since the rise of the sweep data, the difference $\Delta Lf3$ between the value of the sweep data outputted from the first filter circuit and the value of the sweep data outputted from the second filter circuit is extremely small. Specifically, the relation is $\Delta Lf1 > \Delta Lf2 > \Delta Lf3$.

Using this relation, the region identifier 260 sets a threshold for the difference zLf between the value of the first filter data F1OUT and the value of the second filter data F2OUT. This threshold is set between $\Delta Lf1$ and $\Delta Lf2$. This can be suitably set by experimentation, etc., ahead of time.

The region identifier 260 determines any echo data beyond the timing at which the difference $\Delta Lf$ between the value of the first filter data F1OUT and the value of the second filter data F2OUT is over the threshold to be the echo of a large target. That is, the region identifier 260 detects the position of echo data at this timing as the near end position of the region of the large target in sweep data that includes the echo data. The region identifier 260 including the first filter circuit and the second filter circuit functions as the "first region detector" of the present invention.

The region identifier 260 stores the level (echo level) SE of echo data at the timing when the difference $\Delta Lf$ between the value of the first filter data F1OUT and the value of the second filter data F2OUT goes over the threshold as a determination value LvD. The region identifier 260 then compares the echo level SE and the determination value LvD for echo data beyond this point in the same sweep. If it is found that the echo level SE is below the determination value LvD, the region identifier 260 determines that the echo is not from a large target. That is, the region identifier 260 detects the position of the echo data at this point as the far end position of the region of a large target in sweep data including the echo data.

The region identifier 260 outputs the sweep data directly to the combiner 270, and outputs information identifying the region of the large target and the region other than the large target to the combiner 270.

The combiner 270 combines the sweep data from the region identifier 260 with the suppression-processed data from the Doppler frequency component suppressor 240 based on the region identification information from the region identifier 260, and outputs the result. More specifically, the combiner 270 performs combination processing so that sweep data outputted from the region identifier 260 will be selected for the region of a large target (corresponds to the "first region" in the present invention), and the suppression-processed data outputted from the Doppler frequency component suppressor 240 will be selected for the region other than the large target region (corresponds to the "second region" in the present invention). In other words, combination processing is performed so that sweep data for the region of a large target (the first region) will be given priority over sweep data for a region other than the large target region (second region).

This configuration allows detection image data to be obtained in which clutter is suppressed without suppressing land or other such large targets or moving targets and other such small targets.

Figure 5:
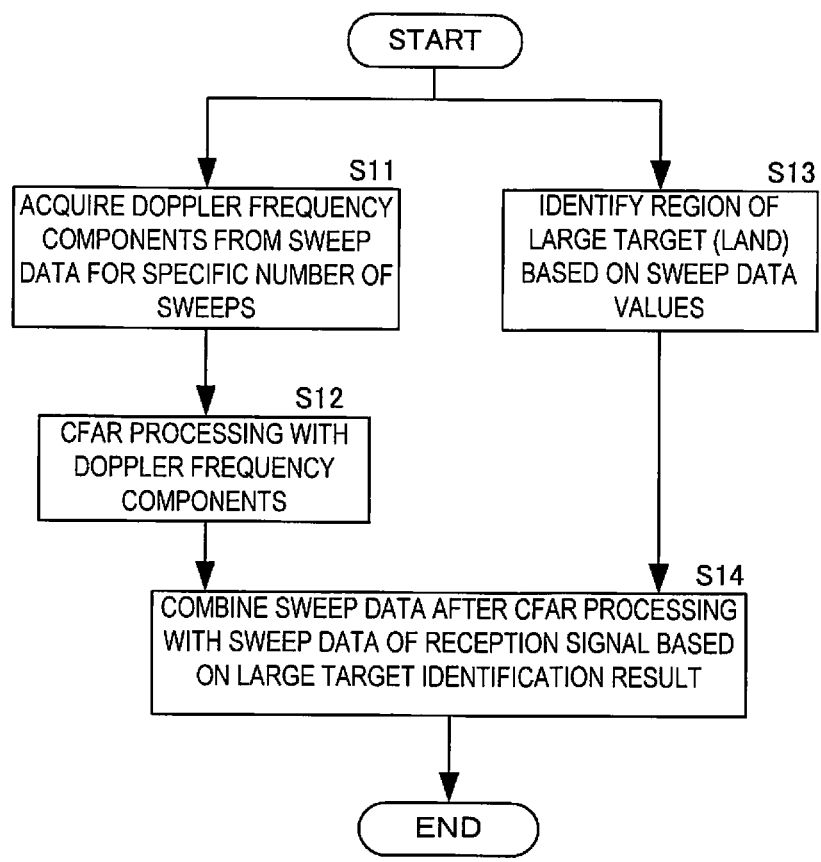
FIG. 5 is a flowchart of the detection image generation method pertaining to the first embodiment of the present invention.

Detection image generation processing that includes the above Doppler processing can also be made into a program that is executed by a computer. FIG. 5 is a flowchart of the detection image generation method pertaining to the first embodiment of the present invention.

First, sweep data is acquired for a specific number (a plurality) of sweeps including the noted sweep, and a plurality of Doppler frequency components corresponding to the respective different frequency bands are calculated (S11).

Then, CFAR processing is performed on each Doppler frequency component (S12). Consequently, only the data values for the echoes of small targets (such as moving targets) are not suppressed, while the data values for echoes of clutter and large targets (such as land) are suppressed. The Doppler frequency components that have undergone this CFAR processing are combined to produce sweep data that has undergone CFAR processing for the noted sweep.

Apart from this CFAR processing, the region of a large target is identified based on the data values for the echo data constituting the sweep data for the noted sweep (S13).

Next, the result of identifying the region of the large target is used to combine the sweep data that has undergone CFAR processing with the sweep data directly from the reception signal, to produce detection image data (S14). More specifically, the sweep data directly from the reception signal is used in the region of the large target, while the sweep data that has undergone CFAR processing is used outside the region of the large target.

Executing this processing allows detection image data to be obtained in which clutter is suppressed without suppressing land or other large targets or moving targets or other small targets.

Figure 6:
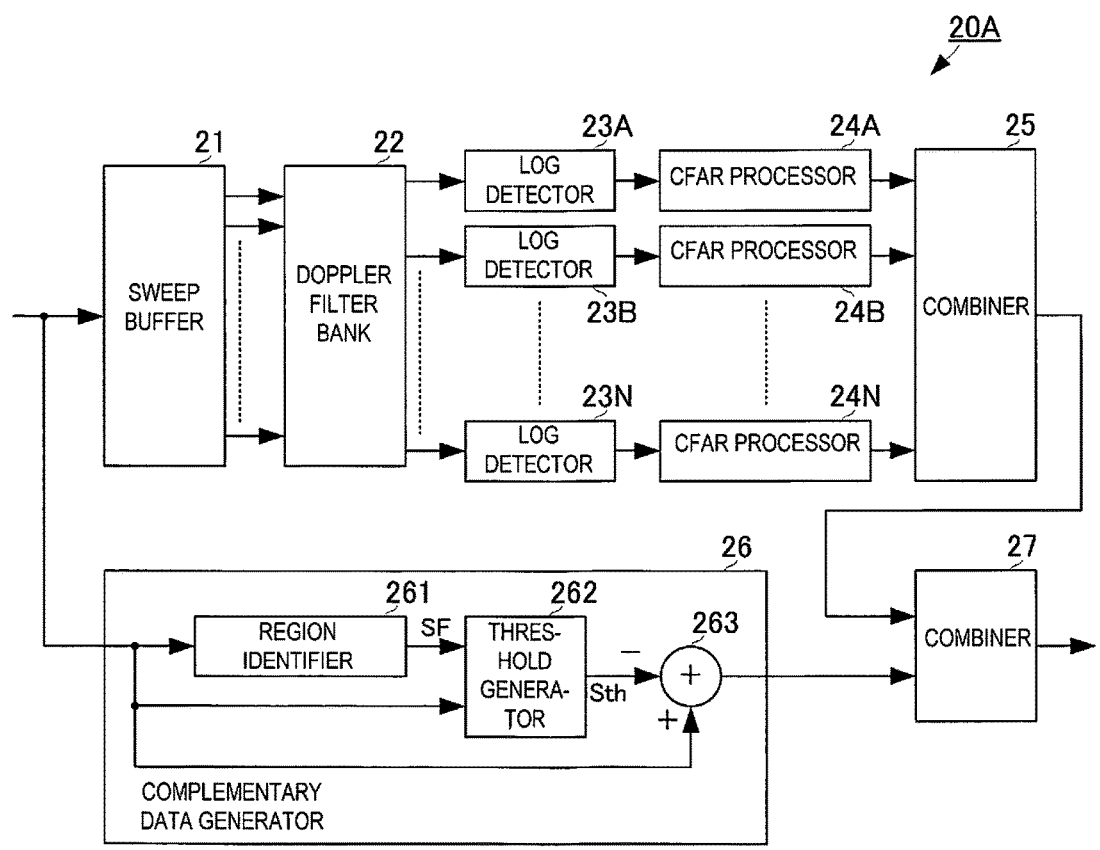
FIG. 6 is a block diagram of the configuration of a Doppler processor in the detection device pertaining to a second embodiment of the present invention.

The Doppler processor in the detection device pertaining to a second embodiment of the present invention will now be described through reference to the drawings. FIG. 6 is a block diagram of the configuration of the Doppler processor pertaining to the second embodiment of the present invention.

A Doppler processor 20A comprises a sweep buffer 21, a Doppler filter bank 22, log detectors 23A to 23N, CFAR processors 24A to 24N, a combiner 25, a complementary data generator 26, and a combiner 27. The sweep buffer 21 and the Doppler filter bank 22 correspond to the "Doppler frequency component generator" of the present invention. The CFAR processors 24A to 24N correspond to the "Doppler frequency component suppressor" of the present invention, and more particularly to the "second Doppler frequency component suppressor."

The sweep buffer 21 is a memory for storing sweep data for a preset number of sweeps. The sweep buffer 21 sequentially stores the sweep data output from the receiver 10. The sweep buffer 21 outputs the stored sets of sweep data to the Doppler filter bank 22.

The Doppler filter bank 22 executes discrete Fourier transform processing the (DFT processing) on the plurality of sets of sweep data, resolving the data into a plurality of Doppler frequency components. In this embodiment, an example is given of resolving into N-number (N is an integer corresponding to the required speed resolution) of Doppler frequency components. The N-number of Doppler frequency components are outputted to the respective log detectors 23A to 23N.

The log detectors 23A to 23N subject the inputted Doppler frequency components to log detection, and output the results to the respective CFAR processors 24A to 24N. Log detection is a method for detecting the data value of an inputted Doppler frequency component by logarithmic transformation.

The CFAR processors 24A to 24N calculate a moving average of the values of the log-detected Doppler frequency components. The CFAR processors 24A to 24N execute CFAR processing by subtracting the moving average value from the value of the Doppler frequency components. Using this CFAR processing suppresses data values over a wide range when there is no fluctuation or almost no fluctuation in the data values (the values of the Doppler frequency components) over these ranges. Consequently, the data values are suppressed for land or other such large targets, or clutter, for example. Also, when this CFAR processing is used, if the data values locally fluctuate sharply, these fluctuating data values are not suppressed. Consequently, data values for relatively small targets (such as moving targets) consisting of a speed that is different from that for clutter, land, or the like can be left behind without being suppressed.

The combiner 25 combines the CFAR-processed Doppler frequency components outputted from the CFAR processors 24A to 24N to produce CFAR-processed sweep data for the noted sweep. The CFAR-processed sweep data is data in which the data values (echo levels) for moving bodies and other such small targets are not suppressed, while the data values (echo levels) for land or other such large targets or clutter are suppressed.

The complementary data generator 26 detects the range of a large target, performs processing of sweep data so that data values (echo levels) will not be suppressed over the range of the large target, and outputs complementary sweep data. The specific configuration of the complementary data generator 26, as well as the specific method for generating complementary sweep data, will be discussed below.

The combiner 27 performs MAX extraction processing on the complementary sweep data and each set of echo data for the CFAR-processed sweep data, and outputs the MAX extraction-processed sweep data as sweep data for the generation of detection image data, to the image data generator 30. Here, MAX processing is processing to compare the echo data of the sweep data after CFAR processing with the echo data of the complementary sweep data, at the same distance position, and output the one with the higher data value.

Performing this processing combines the CFAR-processed sweep data in which only moving targets or other small targets are left behind, with the complementary sweep data in which the echoes of large targets are left behind. Consequently, unnecessary components such as clutter are suppressed, and image data can be obtained in which both the echoes of large targets and the echoes of moving targets or other small targets are left.

Next, the specific configuration of the complementary data generator and the specific method of generating complementary sweep data will be described.

The complementary data generator 26 comprises a region identifier 261, a threshold generator 262, and a subtractor (adder) 263. The echo data is inputted to the region identifier 261, and the region identifier 261 outputs a large target detection flag SF based on the inputted echo data.

The region identifier 261 detects the region of a large target from the sweep data using the same method as in the first embodiment above. The region identifier 261 outputs a large target detection flag SF of "Low" to the threshold generation unit 262 in the range in which no large target is detected, and outputs a large target detection flag SF of "Hi" to the threshold generation unit 262 in the range in which a large target is detected. In addition, the region identifier 261 outputs to the threshold generator 262 the echo level SE at the point when the large target detection flag SF switches from "Low" to "Hi," that is, the determination value LvD.

If the large target detection flag SF is "Low," the threshold generator 262 outputs the echo level SE as a threshold Sth. If the large target detection flag SF is "Hi," the threshold generator 262 outputs the determination value LvD as the threshold Sth. Then, if the large target detection flag SF switches from "Hi" to "Low," the threshold generator 262 output the echo level SE at the point as the threshold Sth.

The subtractor 263 subtracts the threshold value Sth from the echo level SE, and generates and outputs complementary sweep data Sout. With such a configuration, the combination of the threshold generator 262 and the subtractor 263 functions as the "first Doppler frequency component suppressor" of the present invention. Consequently, since only processing to subtract the threshold Sth from the echo level SE is required, the suppression processing performed by the "first Doppler frequency component suppressor" of the present invention has a lower suppression effect than suppression processing performed by the "second Doppler frequency component suppressor" of the present invention in which CFAR processing is used. Therefore, echo level SE is not suppressed more than necessary.

The result of the above configuration and processing is that complementary sweep data including the large target is generated as shown FIGS. 7A, 7B, 7C and 7D. FIGS. 7A, 7B, 7C and 7D are graphs of the waveforms of the sweep data (echo level) SE, the large target detection flag SF, the threshold Sth, and the complementary sweep data Sout.

Figure 7A:
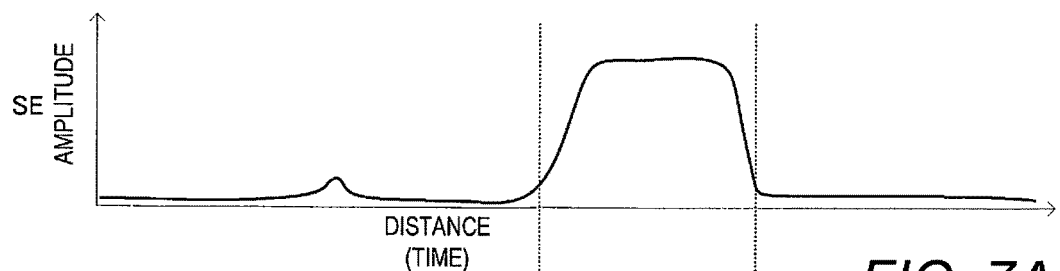
FIGS. 7A, 7B, 7C and 7D are graphs of the waveforms of sweep data (echo level) SE, large target detection flag SF, threshold Sth, and complementary sweep data Sout.
Figure 7B:
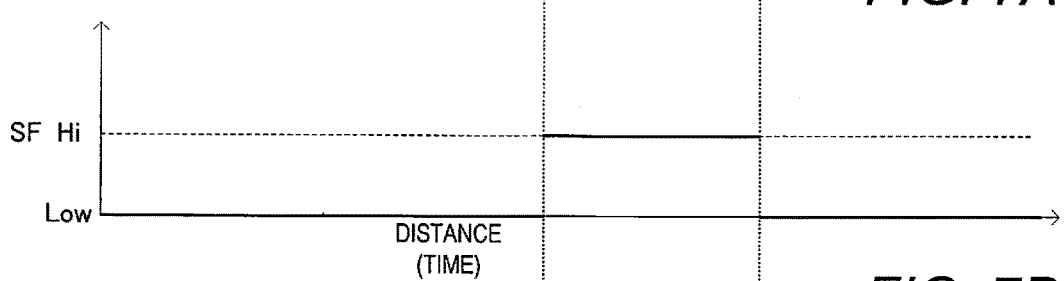

As shown in FIGS. 7A and 7B, the large target detection flag SF changes from "Low" to "Hi" at the point when there is a change from a range in which no large target is present to a range in which a large target is present. Also, the large target detection flag SF changes from "Hi" to "Low" at the point when there is a change from a range in which a large target is present to a range in which no large target is present.

Figure 7C:
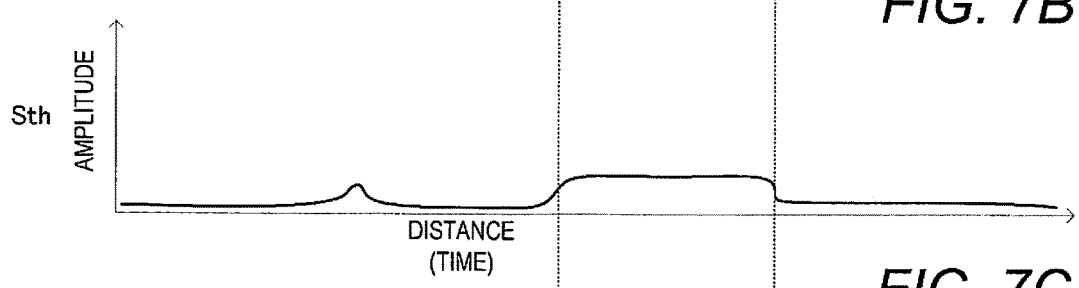

As shown in FIGS. 7A, 7B, and 7C, during the period in which the large target detection flag SF is "Low" (outside the range of the large target), the threshold Sth is at the echo level SE. During the period in which the large target detection flag SF is "Hi" (within the range of the large target), the threshold Sth is at the determination value LvD.

Figure 7D:
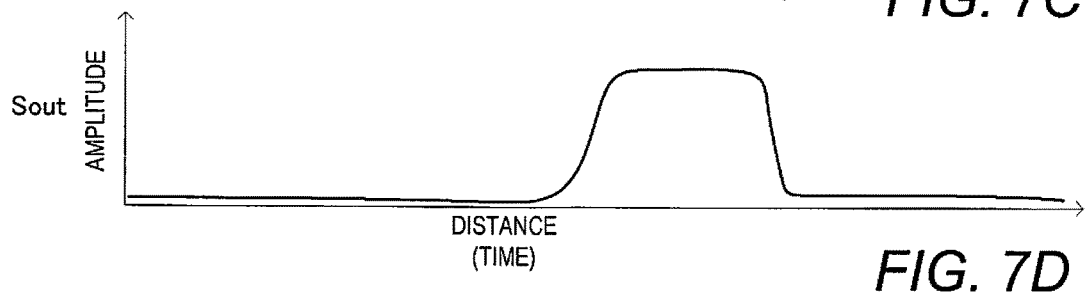

The complementary sweep data Sout is obtained by subtracting the threshold Sth from the echo level SE. Therefore, as shown in FIGS. 7A, 7C, and 7D, during the period in which the large target detection flag SF is "Low" (outside the range of the large target), the echo level SE and the threshold. Sth are the same, so echoes are suppressed. On the other hand, during the period in which the large target detection flag SF is "Hi" (within the range of the large target), the threshold Sth is much lower than the echo level SE, so the echo level SE is not suppressed, and the echo of the large target remains.

Thus, by using the complementary data generator 26 of this embodiment, the complementary sweep data is sweep data in which only the echo of a large target remains. Large target detection and threshold value setting are not limited to using filter circuits with different filter coefficients as described above. For example, a ship may have a function for acquiring its own position, and if there is a chart, the position of land or other such large targets is known in advance, so the threshold may be set or the complementary sweep data formed from the position information about these large targets. Or, another method may be used in which sweeps in which high data values are continuous can be detected.

Figure 8:
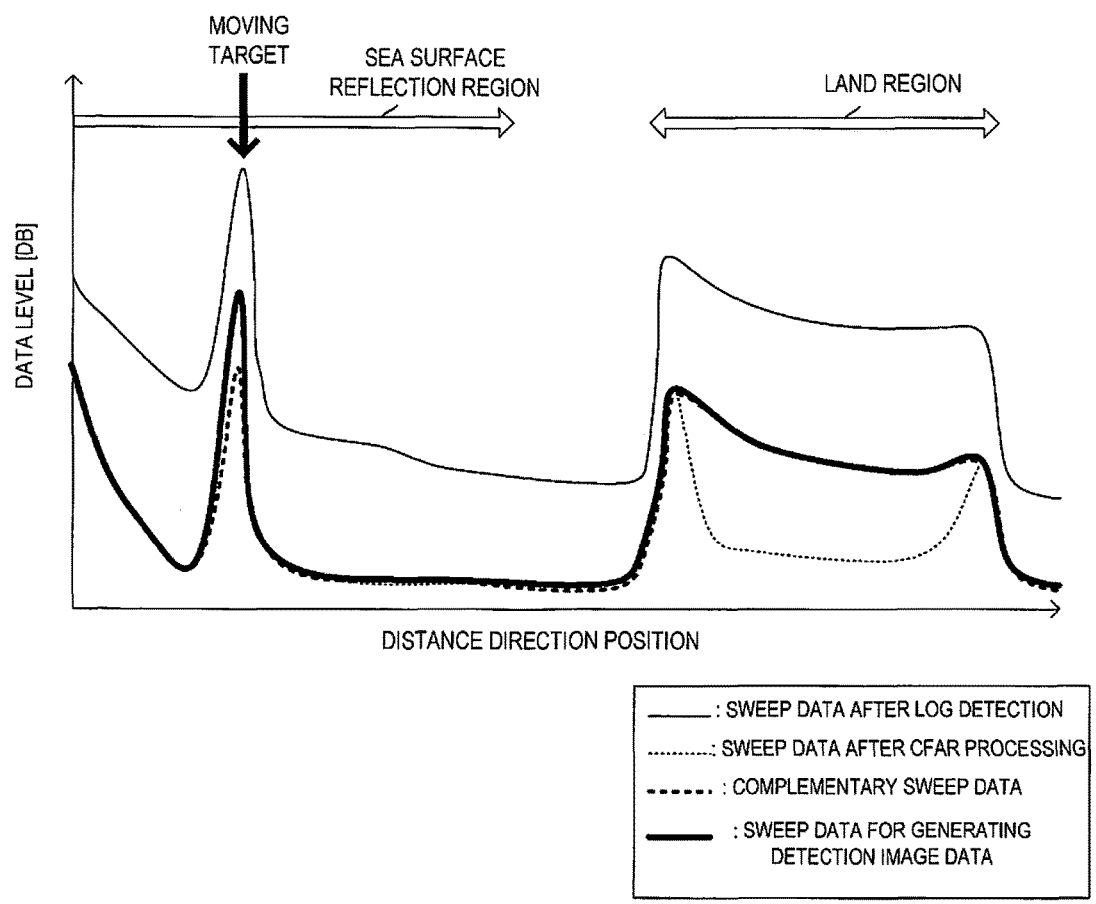
FIG. 8 is a graph of the transition state of sweep data values when using the Doppler processor pertaining to the second embodiment.

FIG. 8 is a graph of the transition state of sweep data values when using the Doppler processor pertaining to the second embodiment. In FIG. 8, the thin solid line shows the sweep data after log detection, and the thin broken line shows the sweep data after CFAR processing. The thick broken line shows the complementary sweep data, and the thick solid line shows the sweep data for generation of detection image data.

As shown in FIG. 8, if the Doppler processor 20A in this embodiment is used, sea surface reflections will be suppressed, while moving targets (small targets) within sea surface reflections will not be suppressed. Also, if the Doppler processor 20 in this embodiment is used, land and other such large targets will not be suppressed, either.

The configuration of this embodiment allows sweep data to be obtained in which clutter is suppressed, but neither moving targets or other such small targets nor land or other such large targets are suppressed.

Figure 9:
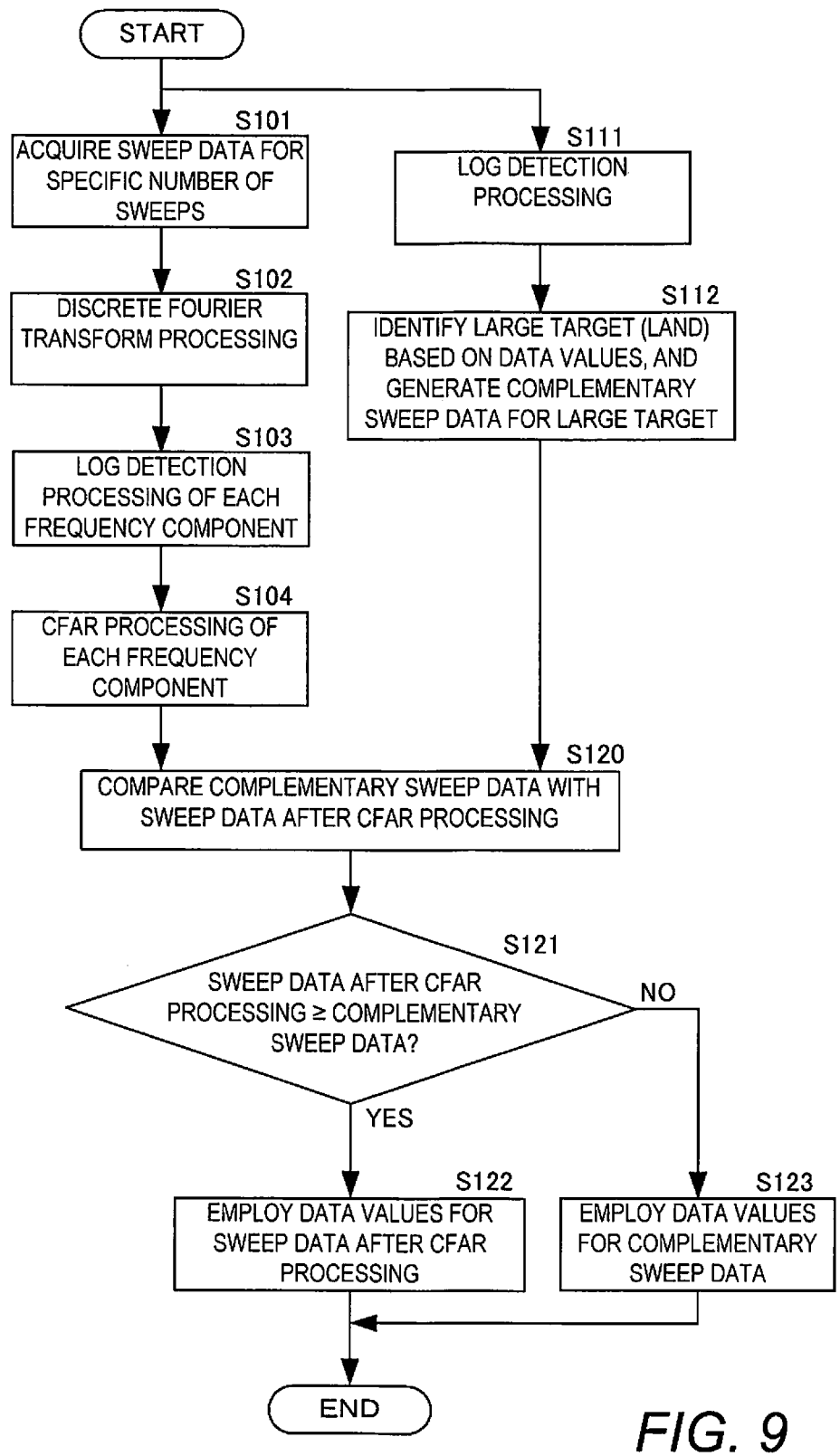
FIG. 9 is a flowchart of the detection image generation method pertaining to the second embodiment of the present invention.
Figure 10:
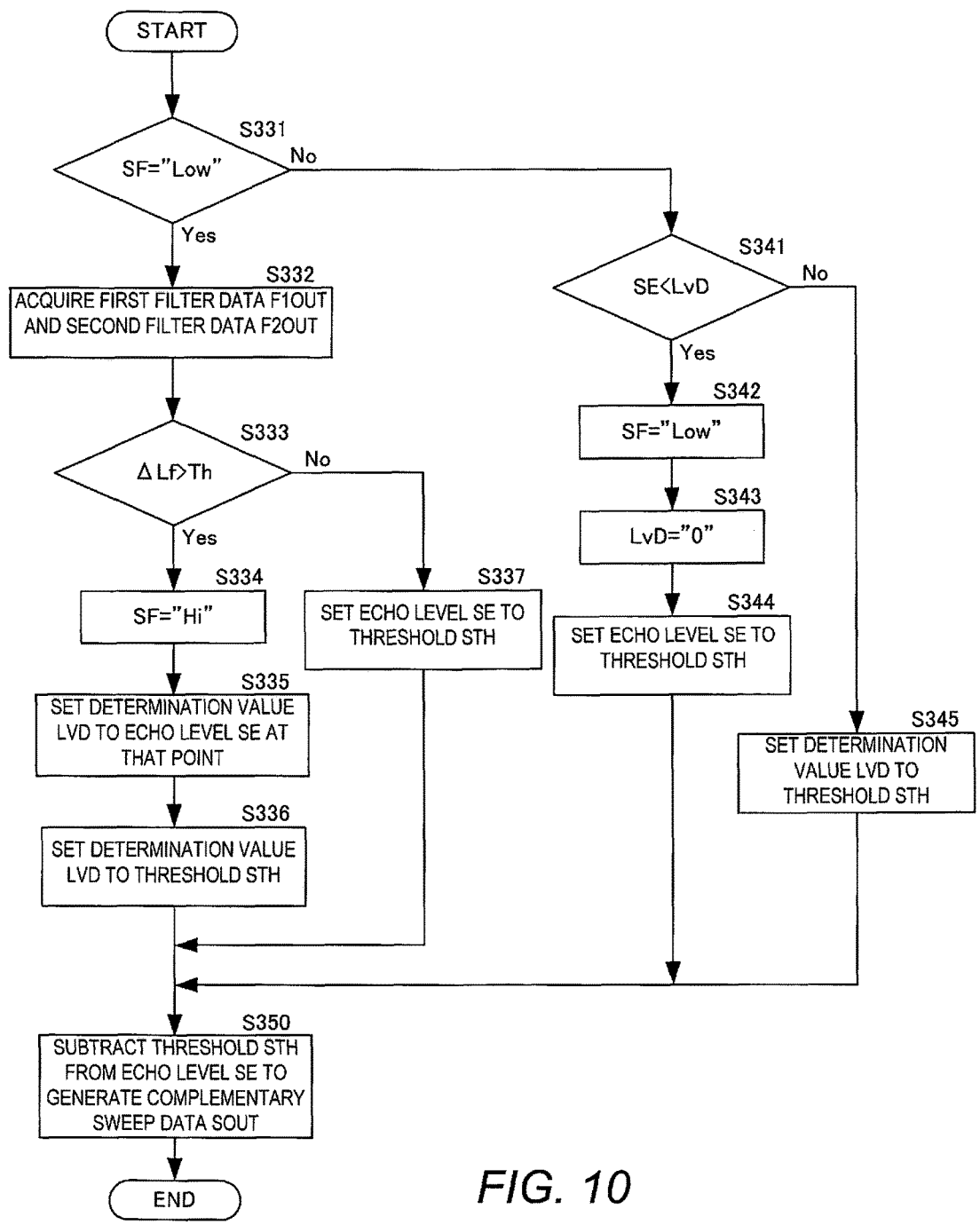
FIG. 10 is a flowchart of a method for forming complementary sweep data used for a large target.

This detection image generation processing that includes Doppler processing can also be made into a program that is executed by a computer. FIGS. 9 and 10 show the flow of this processing. FIG. 9 is a flowchart of a detection image generation method pertaining to the second embodiment of the present invention.

First, sweep data is acquired for a specific number (a plurality) of sweeps including the noted sweep (S101). Then, discrete Fourier transform processing is executed for a plurality of sets of sweep data (S102). As a result, a plurality of Doppler frequency components corresponding to the respective different frequency bands are calculated.

Next, log detection processing is executed for each Doppler frequency component (S103). The Doppler frequency components that have undergone log detection are then subjected to the above-mentioned CFAR processing (S104). Consequently, only the data values for echoes of small targets (such as moving targets) are not suppressed, while the data values for echoes of clutter and large targets (such as land) are suppressed.

The Doppler frequency components that have undergone this CFAR processing are combined to produce CFAR-processed sweep data for the noted sweep.

Apart from this CFAR processing, log detection processing is executed for the sweep data of the noted sweep (S111). Then, the region of the large target is identified based on the data values of the various echo data constituting the sweep data after log detection, and complementary sweep data for large targets is generated (S112).

A method for generating complementary sweep data for a large target will now be described through reference to FIG. 10. FIG. 10 is a flowchart of a method for forming complementary sweep data for a large target.

First, it is confirmed whether or not the large target detection flag SF is "Low." If the large target detection flag SF is "Low" (Yes in S331), the first filter data F1OUT and the second filter data F2OUT are acquired (S332). The difference ΔLf between the first filter data F1OUT and the second filter data F2OUT is calculated.

If the difference ΔLf is greater than a difference threshold Th used for large target detection (Yes in S333), the large target detection flag SF is set to "Hi" (S334). The echo level SE is then set to the determination value LvD at the point when the difference ΔLf becomes greater than the difference threshold Th (S335). Furthermore, this determination value LvD is set to the threshold Sth (S336). That is, if the near end of a large target is detected, the threshold Sth is set to the determination value LvD in a range of large targets farther away than this.

If the difference ΔLf is under the difference threshold Th used for large target detection (No in S333), the large target detection flag SF is not changed to "Hi," and the echo level SE is set to the difference threshold Th (S337). Specifically, the difference threshold Th is set to the echo level SE outside of the range of a large target (until a large target is detected).

If the large target detection flag SF is "Hi," that is, if the determination that the large target detection flag SF is "Low" is "No" (No in S331), it is confirmed whether or not the echo level SE is lower than the determination value LvD.

If the echo level SE is at or over the determination value LvD (No in S341), the LVD is set to the small target (S345). That is, if still within the range of a large target, the small target is left at the determination value LvD.

If the echo level SE is less than the determination value LvD (Yes in S341), the large target detection flag SF is set to "Low" (S342), and the determination value LvD is initialized at zero (S343). The echo level SE is then set to the threshold Sth at the point when the echo level SE drops below the determination value LvD (S344). Specifically, when the far end of a large target is detected, the threshold Sth is set to the echo level SE in the large target range farther away than this.

The threshold Sth that has thus been if-divided is subtracted from the echo level SE to generate the complementary sweep data Sout (S350). Consequently, only echoes of large targets remain (not are suppressed) in the sweep data.

Next, the data values of the complementary sweep data are is compared with the data values of the sweep data after CFAR processing (CFAR result) (S120). Here, data values at the same distance position are compared.

If the data value of the sweep data after CFAR processing (CFAR result) are at or above the data values of the complementary sweep data (Yes in S121), the data values of the CFAR result are employed for the echo data values (S122). If the data values of the sweep data after CFAR processing (CFAR result) are less than the data values of the complementary sweep data (No in S121), the data values of the complementary sweep data are employed for the echo data values (S123).

This processing allows sweep data to be obtained in which clutter suppressed, but neither moving targets or other such small targets nor land or other such large targets are suppressed.

Figure 11:
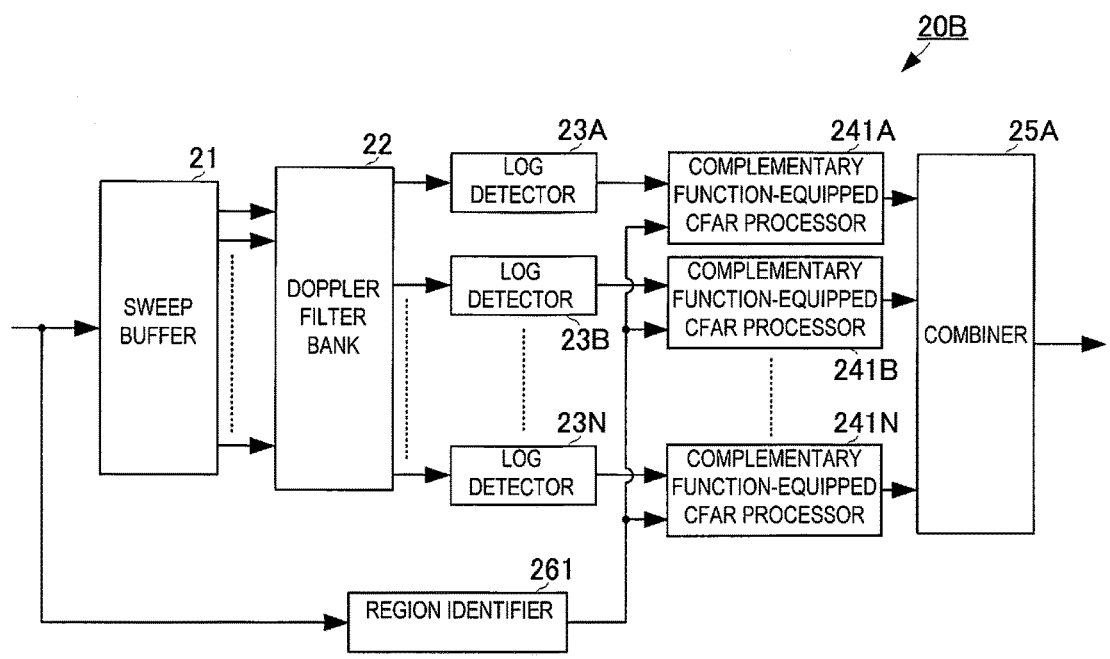
FIG. 11 is a block diagram of the configuration of the Doppler processor pertaining to a third embodiment of the present invention, and a block diagram of the configuration of a large target identifier.

Next, the detection device pertaining to a third embodiment will be described through reference to the drawings. FIG. 11 is a block diagram of the configuration of a Doppler processor pertaining to the third embodiment of the present invention.

With the detection device in this embodiment, the configuration and processing of a Doppler processor 20B are different from those of the Doppler processor 20A in the second embodiment, but the rest of the configuration and processing are the same. Therefore, the configuration and processing will be described in detail only for the part that is different (the Doppler processor 20B).

The Doppler processor 20B comprises the sweep buffer 21, the Doppler filter bank 22, the log detectors 23A to 23N, complementary function-equipped CFAR processors 241A to 241N, a combiner 25A, and the region identifier 261. The configuration and processing of the sweep buffer 21, the Doppler filter bank 22, and the log detectors 23A to 23N are the same as in the first embodiment, and will not be described again. The complementary function-equipped CFAR processors 241A to 241N function as the "first Doppler frequency component suppressor" and the "second Doppler frequency component suppressor" of the present invention. The combiner 25A corresponds to the "combiner" of the present invention.

The region identifier 261 has the same configuration and performs the same processing as the region identifier in the first embodiment, and generates a large target detection flag SF. The region identifier 261 outputs the large target detection flag SF to the complementary function-equipped CFAR processors 241A to 241N.

The complementary function-equipped CFAR processors 241A to 241N calculate the moving average of the value of the log-detected Doppler frequency component if the large target detection flag SF is "Low."

If the large target detection flag SF is "Hi," the complementary function-equipped CFAR processors 241A to 241N temporarily halt calculation of the moving average, and if the large target detection flag SF is "Hi," the value of the Doppler frequency component is set to the threshold Sth at the point when the large target detection flag SF switches from "Low" to "Hi."

The complementary function-equipped CFAR processors 241A to 241N subtract the moving average from the value of the Doppler frequency component during the period in which the large target detection flag SF is "Low" (CFAR processing). The complementary function-equipped CFAR processors 241A to 241N subtract the threshold Sth from the value of the Doppler frequency component during the period in which the large target detection flag SF is "Hi." The subtraction result is outputted to the combiner 25A.

By using this CFAR processing with a complementary function, in the case of a large target (such as land) for which the data value (the value of the Doppler frequency component) hardly changes over a wide range, the value of the Doppler frequency component is subtracted from the low threshold Sth (low level). Therefore, the data value for the echo of a large target will not be suppressed. Also, in the case of small target (such as a moving target) whose data value undergoes sharp local fluctuations, the moving average of low values is subtracted from the value of the Doppler frequency component. Therefore, the data value for an echo of a small target is not suppressed, either. Furthermore, in the case of clutter, the moving average of values corresponding to the magnitude of the clutter is subtracted from the value of the Doppler frequency component. Therefore, the data value for an echo of clutter is suppressed.

The combiner 25 executes inverse Fourier transform processing on the Doppler frequency components outputted from the respective complementary function-equipped CFAR processors 241A to 241N, and generates sweep data for the noted sweep. This sweep data becomes sweep data for forming a detection image, and is outputted to the image data generator 30.

Figure 12:
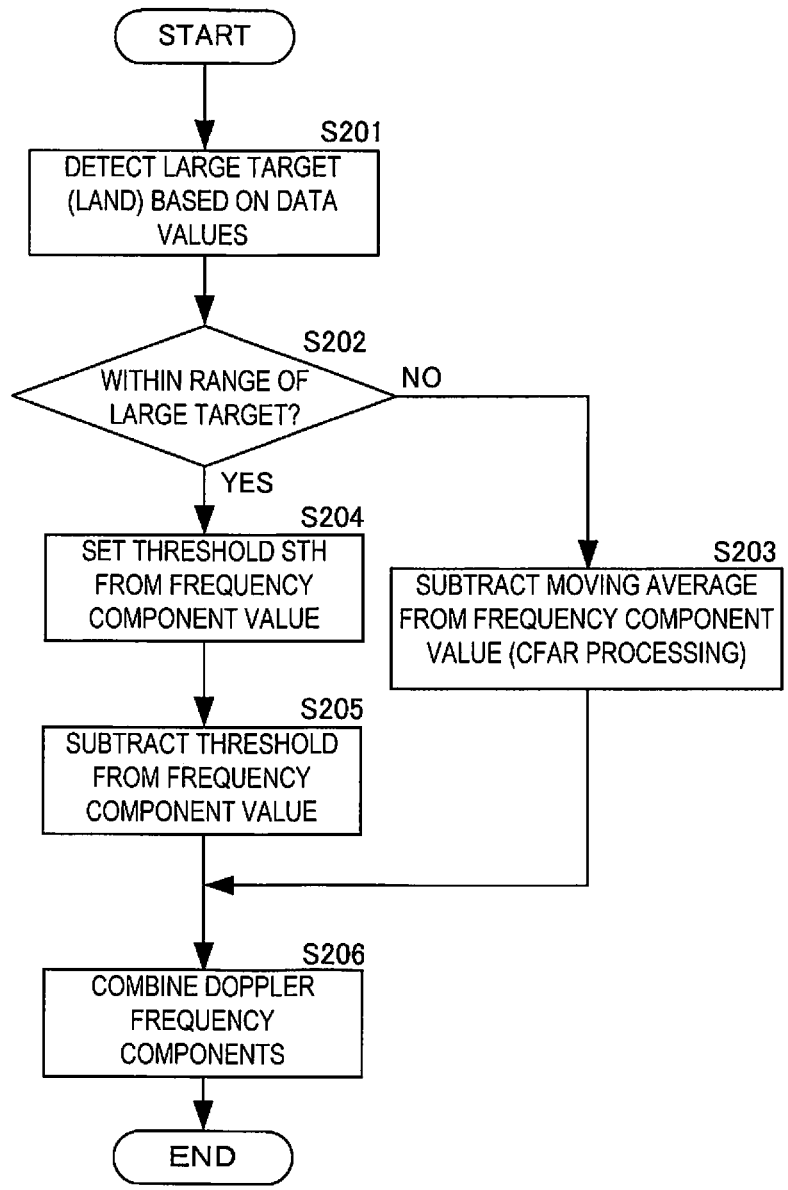
FIG. 12 is a flowchart of the detection image generation flow pertaining to the third embodiment of the present invention.

The detection image generation processing that includes Doppler processing in this embodiment can also be made into a program that is executed by a computer. FIG. 12 shows the flow of this processing. FIG. 12 is a flowchart of the detection image generation flow pertaining to a third embodiment of the present invention.

First, everything from the calculation of the Doppler frequency components up to the calculation of the moving average is performed in the same manner as in the second embodiment.

Apart from this calculation of a moving average, log detection processing is executed on the sweep data for the noted sweep, and the region of the large target is identified based on the data values for the various echo data constituting the sweep data after log detection (S201).

If it is not within the range of the large target (No in S202), the moving average is subtracted from the value of the Doppler frequency components (S203). By this processing, the data values for echoes of clutter can be suppressed, without suppressing the data values for echoes of small targets (such as moving targets).

If within the range of a large target (Yes in S202), the threshold Sth is set from the value of the Doppler frequency component (S204). The threshold Sth is then subtracted from the value of the Doppler frequency component (S205). This processing allows the data values for echoes of large targets (such as land) not to be suppressed in the region in which the large targets are being detected.

This CFAR processing that is executed while selecting the value to be subtracted from the value of the Doppler frequency component is referred to as complementary function-equipped CFAR processing.

A plurality of Doppler frequency components that have undergone complementary function-equipped CFAR processing are then combined to obtain sweep data that has undergone complementary function-equipped CFAR processing (S206).

Using such a process allows sweep data to be obtained in which clutter is suppressed, but neither moving targets or other such small targets nor land or other such large targets are suppressed.

Thus, using the configuration and processing of the third embodiment allows clutter to be suppressed, without suppressing the echoes of relatively small targets such as moving targets or of large targets such as land, as is the case with the second embodiment.

Figure 13:
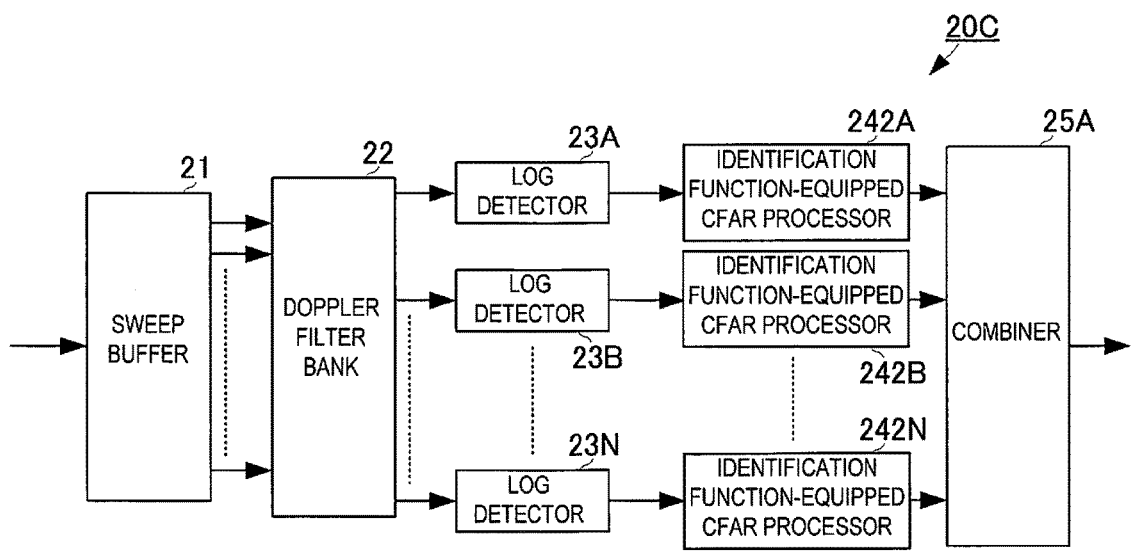
FIG. 13 is a block diagram of the configuration of the Doppler processor pertaining to a fourth embodiment of the present invention.

Next, the detection device pertaining to a fourth embodiment of the present invention will be described through reference to the drawings. FIG. 13 is a block diagram of the configuration of a Doppler processor pertaining to the fourth embodiment of the present invention. With the detection device in this embodiment, the configuration and processing of a Doppler processor 20C are different from those of the Doppler processors 20A and 20B in the first and second embodiments, but the rest of the configuration and processing are the same. Therefore, the configuration and processing will be described in detail only for the part that is different (the Doppler processor 20C).

The Doppler processor 20C comprises the sweep buffer 21, the Doppler filter bank 22, the log detectors 23A to 23N, identification function-equipped CFAR processors 242A to 242N, and the combiner 25A. The configuration and processing of the sweep buffer 21, the Doppler filter bank 22, and the log detectors 23A to 23N are the same as in the second and third embodiments, and will not be described again. The identification function-equipped CFAR processors 242A to 242N function as the "region identifier," the "first Doppler frequency component suppressor," and the "second Doppler frequency component suppressor" of the present invention.

The identification function-equipped CFAR processors 242A to 242N calculate the moving average of the value of the log-detected Doppler frequency component. The identification function-equipped CFAR processors 242A to 242N detect regions of large targets. The identification function-equipped CFAR processors 242A to 242N subtract the moving average from the value of the Doppler frequency component in the region that includes no large target. Within a large target region, the identification function-equipped CFAR processors 242A to 242N subtract the threshold Sth determined based on the value of the Doppler frequency component, from the Doppler frequency component. The method for determining the threshold Sth is the same as with the Doppler processor in the second and third embodiments above.

By this processing, in a region that includes no large target, the data values for echoes of clutter are suppressed, without suppressing the data values for echoes of small targets such as moving targets. Also, within a large target region, the data values for the echoes of land or other such large targets remain without being suppressed. Thus, CFAR processing that is executed according to the detection result of detecting a large target is referred to as identification function-equipped CFAR processing.

The combiner 25 combines the Doppler frequency components that have undergone identification function-equipped CFAR processing outputted from the identification function-equipped CFAR processors 242A to 242N, to generate sweep data of the noted sweep. This sweep data becomes sweep data for forming a detection image, and is outputted to the image data generator 30.

Figure 14:
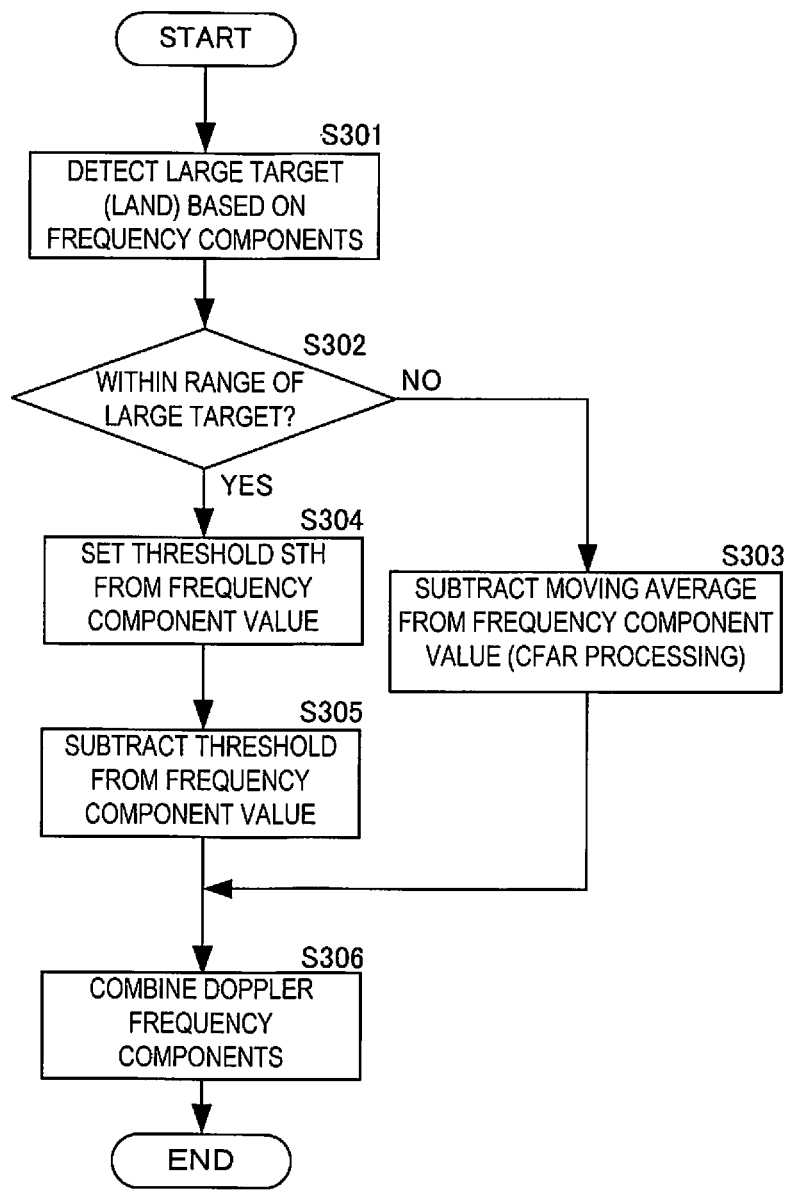
FIG. 14 is a flowchart of the detection image generation flow pertaining to the fourth embodiment of the present invention.

The detection image generation processing including Doppler processing in this embodiment can also be made into a program that is executed by a computer. FIG. 14 shows the flow of this processing. FIG. 14 is a flowchart of the detection image generation flow pertaining to the fourth embodiment of the present invention.

First, everything from the calculation of the Doppler frequency components up to the calculation of the moving average is performed in the same manner as in the second and third embodiments.

Along with this processing to calculate the moving average, the region of a large target is identified based on the values of the Doppler frequency components (S301).

If not within the range of a large target (No in S302), the moving average is subtracted from the values of the Doppler frequency components (S303). By this processing, the data values for clutter can be suppressed, without suppressing the data values for echoes of small targets (such as moving targets).

If within the range of a large target (Yes in S302), the threshold Sth is set from the values of the Doppler frequency components (S304). The threshold Sth is then subtracted from the values of the Doppler frequency components (S305). By this processing, data values for the echoes of large targets (such as land) will not be suppressed in a region in which a large target has been detected.

Again with processing such as this, sweep data can be obtained in which clutter is suppressed, without suppressing either moving targets or other such small targets, or land or other such large targets.

Figure 15:
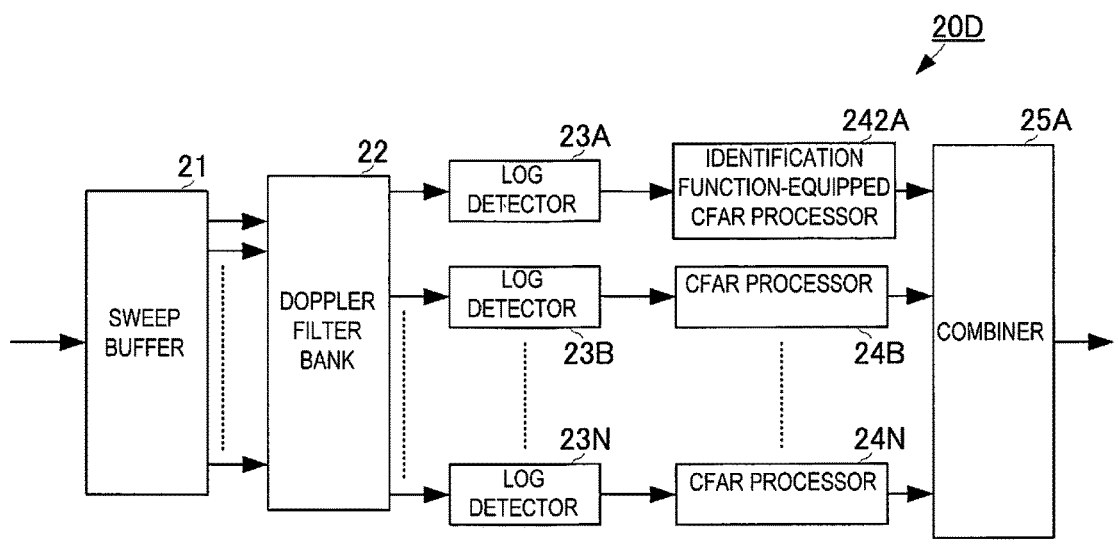
FIG. 15 is a block diagram of the configuration of the Doppler processor pertaining to a fifth embodiment of the present invention.

Next, the detection device pertaining to a fifth embodiment of the present invention will be described through reference to the drawings. FIG. 15 is a block diagram of the configuration of a Doppler processor pertaining to the fifth embodiment of the present invention. With the detection device in this embodiment, the configuration and processing of a Doppler processor 20D are different from those of the Doppler processor 20C in the fourth embodiment, but the rest of the configuration and processing are the same. Therefore, the configuration and processing will be described in detail only for the part that is different (the Doppler processor 20D).

The Doppler processor 20D comprises the sweep buffer 21, the Doppler filter bank 22, the log detectors 23A to 23N, the identification function-equipped CFAR processor 242A, the CFAR processors 24B to 24N, and the combiner 25A.

The configuration and processing of the sweep buffer 21, the Doppler filter bank 22, the log detectors 23A to 23N, and the CFAR processors 24B to 24N are the same those in the second and fourth embodiments. The configuration and processing of the identification function-equipped CFAR processor 242A and the combiner 25A are the same as those in the fourth embodiment.

Specifically, the Doppler processor 20D in this embodiment executes the identification function-equipped CFAR processing for only a particular Doppler frequency component, and executes normal CFAR processing for the other Doppler frequency components.

Here, the particular Doppler frequency component is set to a Doppler frequency component corresponding to the relative speed of a large target (land) with respect to the ship.

When this configuration is used, since the identification function-equipped CFAR processing of a large target is executed only for the Doppler frequency component corresponding to the relative speed of the large target, sweep data can be obtained in which clutter is suppressed, without suppressing either moving targets or other such small targets, or land or other such large targets, and furthermore fewer resources are used.

FIG. 15 shows an example of setting the identification function-equipped CFAR processor for just one Doppler frequency component, but identification function-equipped CFAR processors may also be sent for a plurality of Doppler frequency components. For example, if the range of the Doppler frequency of the relative speed is wider than the frequency range of one Doppler frequency component based on the frequency resolution of the Doppler filter bank, then identification function-equipped CFAR processors should be set for the plurality of continuous Doppler frequency components. Also, if there are large targets that are not land, that is, targets that are large enough to end up being suppressed in normal CFAR processing, and have different speeds, identification function-equipped CFAR processors should be set for the Doppler frequency components corresponding to each of these speeds.

Figure 16:
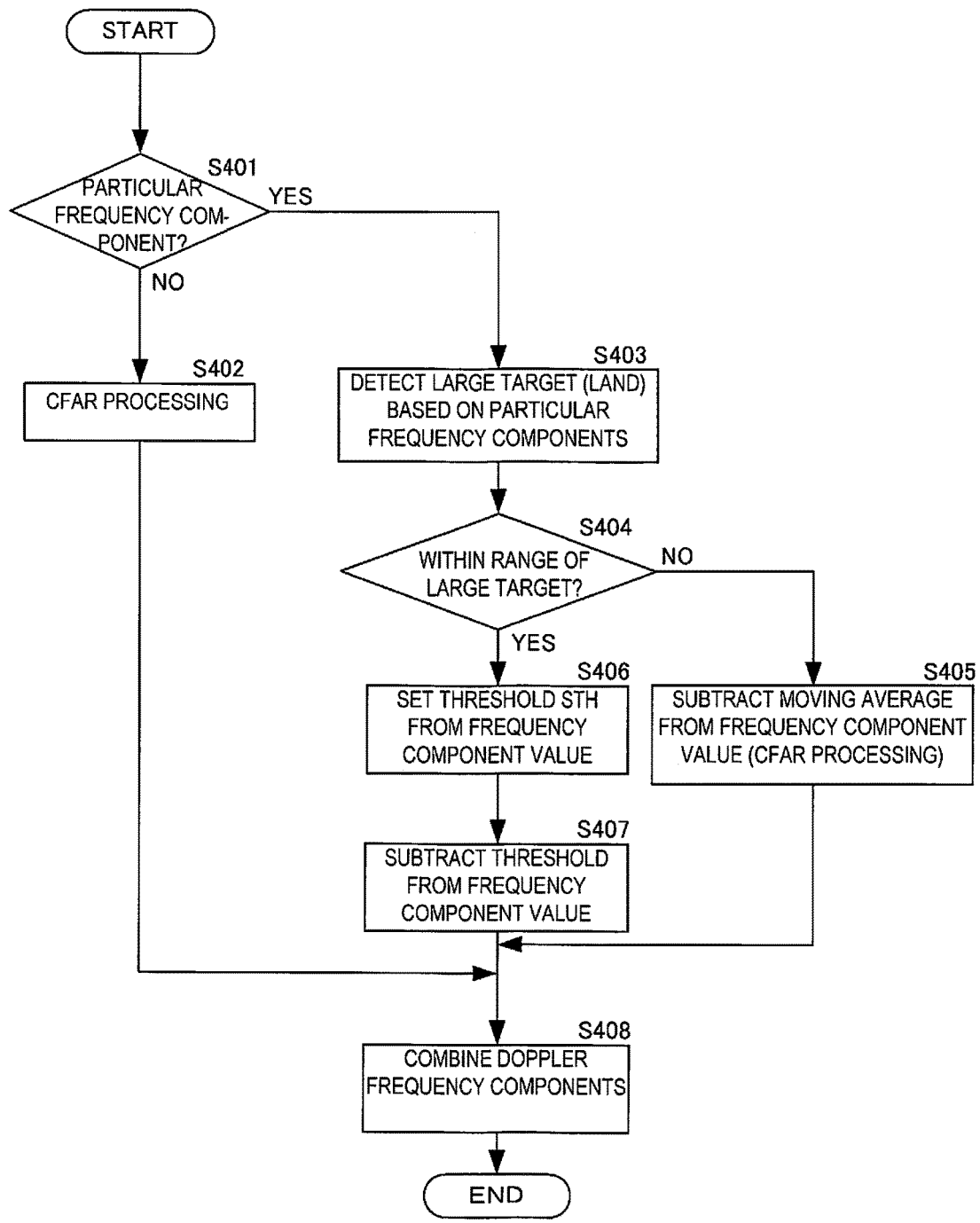
FIG. 16 is a flowchart of the detection image generation flow pertaining to the fifth embodiment of the present invention.

The detection image generation processing that includes Doppler processing as given in this embodiment can also be made into a program that is executed by a computer. FIG. 16 shows the flow of this processing. FIG. 16 is a flowchart of the detection image generation flow pertaining to the fifth embodiment of the present invention.

First, everything from the calculation of the Doppler frequency components up to the calculation of the moving average is performed in the same manner as in the second, third, and fourth embodiments.

If not the particular Doppler frequency component (No in S401), CFAR processing is performed using the moving average (S402).

For the particular Doppler frequency component (Yes in S401), the region of the large target is identified based on the value of the particular Doppler frequency component (S403).

If not in the range of a large target (No in S404), the moving average is subtracted from the value of the Doppler frequency component (S405). By this processing, in a region in which no large target has been detected, data values for the echoes of clutter can be suppressed, without suppressing the data values for echoes of small targets (moving targets).

If within the range of a large target (Yes in S404), the threshold Sth is set from the value of the Doppler frequency component (S406). The threshold Sth is then subtracted from the value of the Doppler frequency component (S407). This processing allows the data values for the echo of a large target (such as land) to be suppressed in a region in which a large target has been detected.

Next, the particular Doppler frequency component obtained using subtraction processing with the threshold Sth or the CFAR processing produced above, is combined with the other Doppler frequency components that have undergone ordinary CFAR processing (S408). Consequently, sweep data is obtained that has undergone identification function-equipped CFAR processing of the noted sweep.

Using this processing allows sweep data to be obtained in which clutter is suppressed, without suppressing either moving targets or other such small targets, or land or other such large targets.

Figure 17:
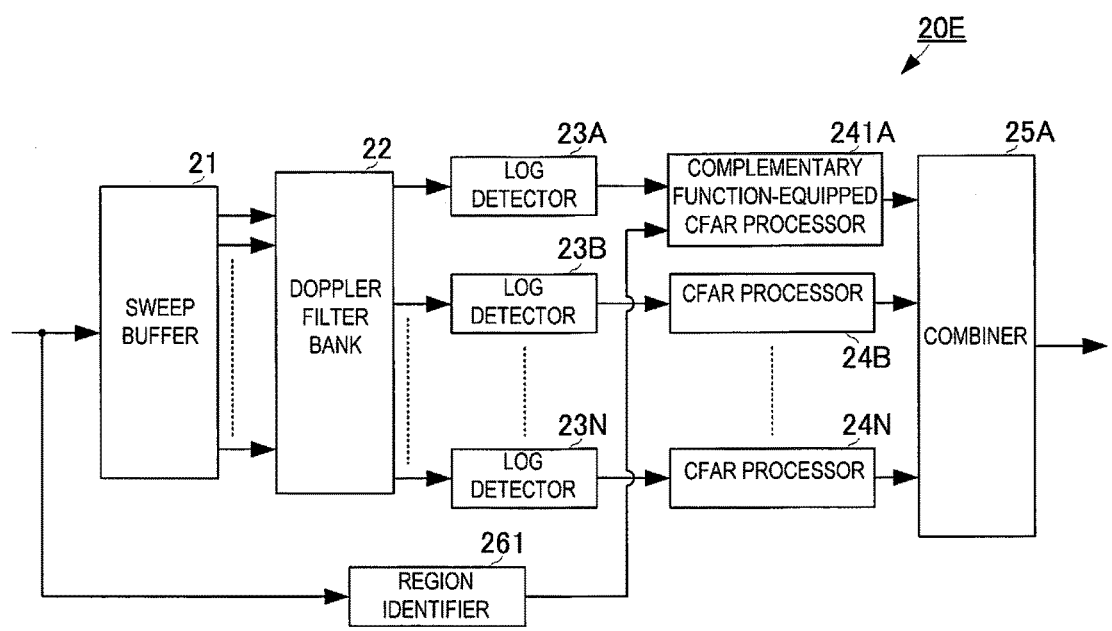
FIG. 17 is a block diagram of the configuration of the Doppler processor pertaining to a sixth embodiment of the present invention.

Next, the detection device pertaining to a sixth embodiment of the present invention will be described through reference to the drawings. FIG. 17 is a block diagram of the configuration of a Doppler processor 20E pertaining to the sixth embodiment of the present invention. The configuration and processing of the Doppler processor 20E in the detection device of this embodiment are different from those of the Doppler processor 20B in the third embodiment, but the rest of the configuration and processing are the same. Therefore, the configuration and processing will be described in detail only for the part that is different (the Doppler processor 20E).

The Doppler processor 20E comprises the sweep buffer 21, the Doppler filter bank 22, the log detectors 23A to 23N, the complementary function-equipped CFAR processor 241A, the CFAR processors 24B to 24N, and the combiner 25A.

The configuration and processing of the sweep buffer 21, the Doppler filter bank 22, the log detectors 23A to 23N, and the CFAR processors 24B to 24N are the same as those in the second and third embodiments. The configuration and processing of the identification function-equipped CFAR processor 242A and the combiner 25A are the same as those in the third embodiment.

Specifically, the Doppler processor 20E in this embodiment executes complementary function-equipped CFAR processing only on a particular Doppler frequency component, and executes normal CFAR processing on the other Doppler frequency components.

Here, the particular Doppler frequency component is set to a Doppler frequency component corresponding to the relative speed of a large target (land) with respect to the ship. The relative speed of the large target with respect to the ship may be set as appropriate.

By using such a configuration, since the complementary function-equipped CFAR processing is executed only on the Doppler frequency component corresponding to the relative speed of the large target, sweep data can be obtained in which clutter is suppressed, without suppressing either moving targets or other such small targets, or land or other such large targets, and furthermore fewer resources are used.

FIG. 17 shows an example in which a complementary function-equipped CFAR processor is set for only one Doppler frequency component, but identification function-equipped CFAR processors may also be sent for a plurality of Doppler frequency components. For example, if the range of the Doppler frequency of the relative speed is wider than the frequency range of one Doppler frequency component based on the frequency resolution of the Doppler filter bank, then complementary function-equipped CFAR processors should be set for the plurality of continuous Doppler frequency components. Also, if there are large targets that are not land, that is, targets that are large enough to end up being suppressed in normal CFAR processing, and have different speeds, complementary function-equipped CFAR processors should be set for the Doppler frequency components corresponding to each of these speeds.

Figure 18:
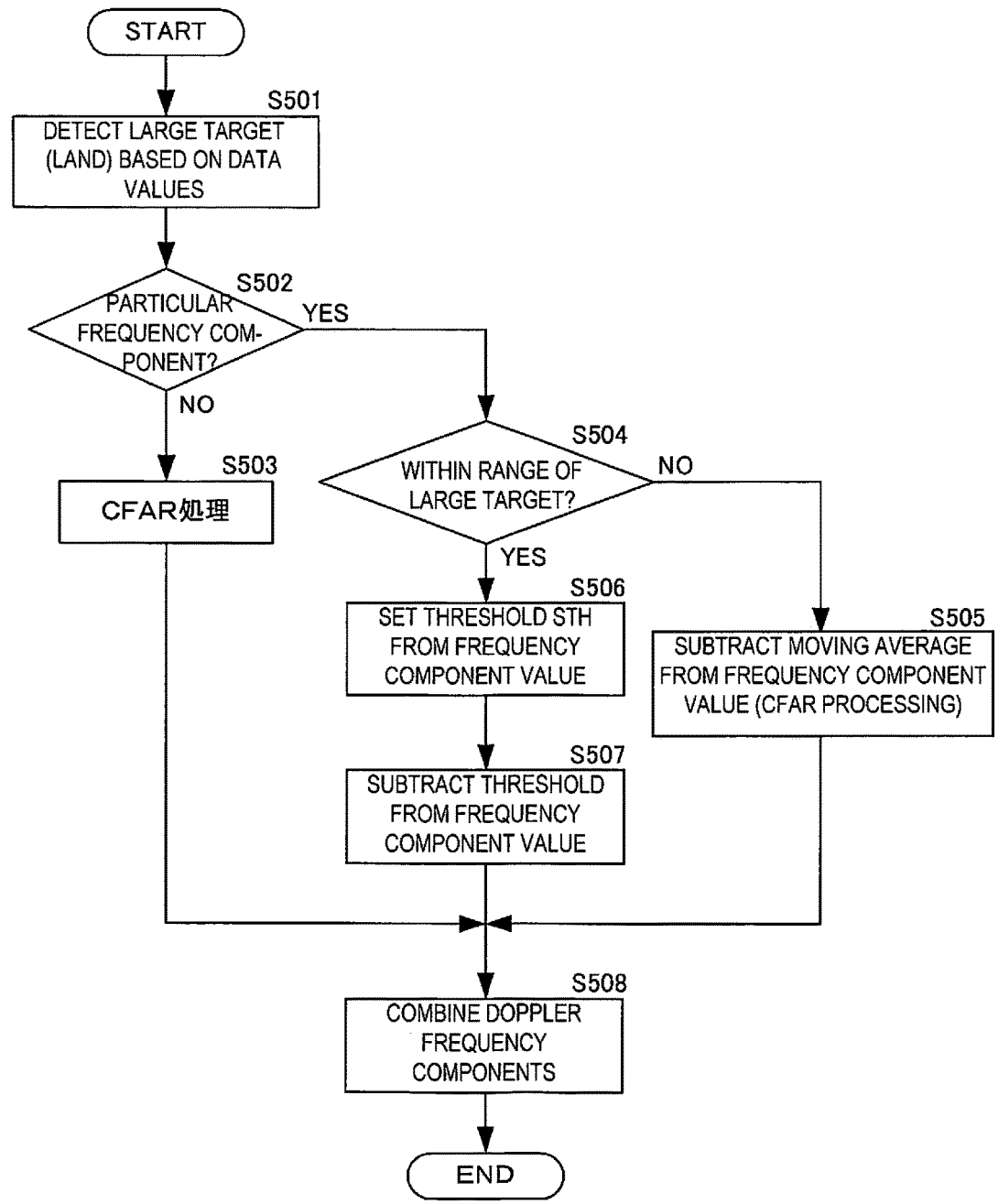
FIG. 18 is a flowchart of the detection image generation flow pertaining to the sixth embodiment of the present invention.

The detection image generation processing that includes Doppler processing as given in this embodiment can also be made into a program that is executed by a computer. FIG. 18 shows the flow of this processing. FIG. 18 is a flowchart of the detection image generation flow pertaining to the sixth embodiment of the present invention.

First, everything from the calculation of the Doppler frequency components up to the calculation of the moving average is performed in the same manner as in the second, third, fourth, and fifth embodiments.

Apart from this calculation of a moving average, log detection processing is executed on the sweep data for the noted sweep, and the region of the large target is identified based on the data values of the echo data constituting the sweep data after log detection (S501).

If not the particular Doppler frequency component (No in S502), CFAR processing is performed using the moving average (S503).

If the particular Doppler frequency component (Yes in S502), it is confirmed whether or not it is within the range of the large target.

If not within the range of the large target (No in S504), the moving average is subtracted from the value of the Doppler frequency component (S505). By this processing, in a region in which no large target has been detected, data values for the echoes of clutter can be suppressed, without suppressing the data values for echoes of small targets (moving targets).

If within the range of the large target (Yes in S504), the threshold Sth is set from the value of the Doppler frequency component (S506). The threshold Sth is then subtracted from the value of the Doppler frequency component (S507). This processing allows the data values for the echo of a large target (such as land) to be suppressed in a region in which a large target has been detected.

Next, the particular Doppler frequency component obtained using subtraction processing with the threshold Sth or the CFAR processing produced above, is combined with the other Doppler frequency components that have undergone ordinary CFAR processing (S508). Consequently, sweep data is obtained that has undergone complementary function-equipped CFAR processing of the noted sweep.

Using this processing allows sweep data to be obtained in which clutter is suppressed, without suppressing either moving targets or other such small targets, or land or other such large targets.

Figure 19:
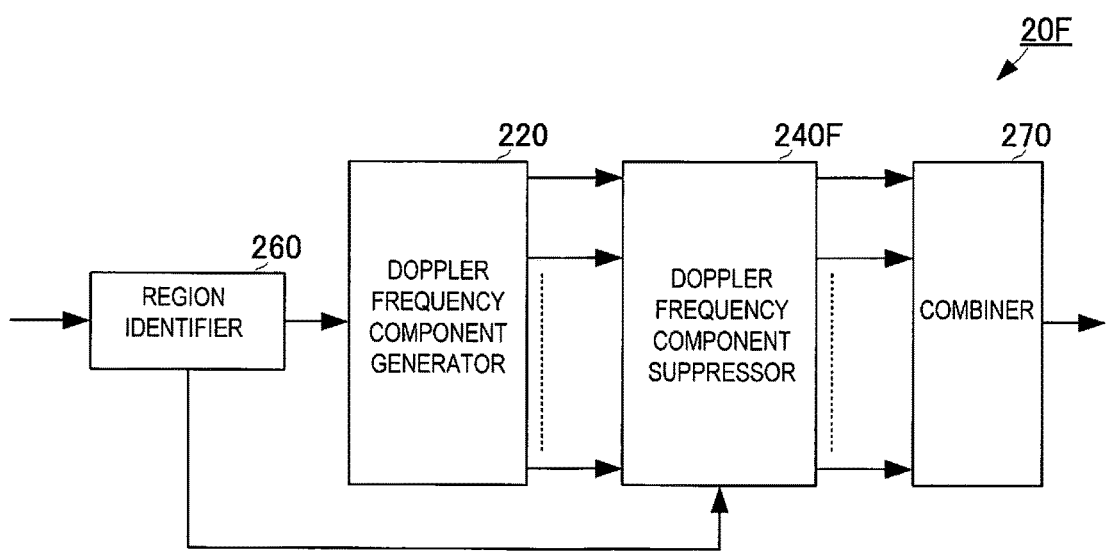
FIG. 19 is a block diagram of the configuration of the Doppler processor pertaining to a seventh embodiment of the present invention.

Next, the detection device pertaining to a seventh embodiment of the present invention will be described through reference to the drawings. FIG. 19 is a block diagram of the configuration of a Doppler processor 20F pertaining to the seventh embodiment of the present invention. The configuration and processing of the Doppler processor 20F in the detection device of this embodiment are different from those of the Doppler processor 20 in the first embodiment, but the rest of the configuration and processing are the same. Therefore, the configuration and processing will be described in detail only for the part that is different (the Doppler processor 20F).

With the Doppler processor 20F, sweep data based on the reception signal is inputted to the region identifier 260. The region identifier 260 uses the above method to identify the region of a large target on the sweep data for the noted sweep including the noted position, and the region other than the large target, from the sweep data, and applies these to a Doppler frequency component suppressor 240F. The region identifier 260 outputs the inputted sweep data directly to the Doppler frequency component suppressor 220.

The Doppler frequency component generator 220 performs Fourier transform from these sets of sweep data to resolve echo data for the noted position of the noted sweep into a plurality of Doppler frequency components. The Doppler frequency component generator 220 outputs the Doppler frequency components thus generated to the Doppler frequency component suppressor 240F.

The Doppler frequency component suppressor 240F performs different process on the Doppler frequency components in the region of the large target and in the region other than the large target, based on the region identification information from the region identifier 260. More specifically, in the region of the large target, the Doppler frequency component suppressor 240F outputs a Doppler frequency component (the data value of the Doppler frequency component) directly to the combiner 270. In a region other than the large target, the Doppler frequency component suppressor 240F performs CFAR processing on the Doppler frequency component (the data value of the Doppler frequency component), and outputs the result to the combiner 270. With this configuration, the Doppler frequency component suppressor 240F functions as the "first Doppler frequency component suppressor" and the "second Doppler frequency component suppressor" of the present invention.

The combiner 270 performs processing to combine the Doppler frequency components outputted from the Doppler frequency component suppressor 240F.

This configuration is similar to the first embodiment in that it allows detection image data to be obtained in which clutter is suppressed, without suppressing either moving targets or other such small targets, or land or other such large targets.

With the embodiments given above, an example was given in which the data values for Doppler frequency components were directly outputted in the region of a large target (first region), but they may instead be outputted after performing processing that has a lower suppression effect on unnecessary signals than the CFAR processing that is performed in the region other than a large target (second region).

The invention claimed is:

1. A detection device configured to detect a target based on a reception signal obtained from a reflection signal of a transmission signal, the detection device comprising:
   processing circuitry configured:
   to acquire at least one Doppler frequency component that indicates the amplitude level of a reception signal, for at least one Doppler frequency, based on the reception signal;
   to provide a first filter and a second filter having mutually different time constants, to identify a first region and a second region that is outside the first region, based on the reception signal, and the first filter and the second filter being configured to detect an edge of the first region when a difference value between output levels of the first filter and the second filter for the reception signal is over a threshold;
   to suppress a Doppler frequency component representing clutter, out of a portion of the Doppler frequency component corresponding to the second region, to form a decluttered portion of the Doppler frequency component corresponding to the second region; and
   to combine the reception signal corresponding to the first region and the decluttered portion of the Doppler frequency component corresponding to the second region.

2. The detection device according to claim 1, wherein the processing circuitry is further configured
   to suppress a portion of the Doppler frequency component corresponding to the first region less than the suppression in the second region, and
   to combine the suppressed portion of the Doppler frequency component corresponding to the first region with the suppressed Doppler frequency component representing clutter out of the portion of the Doppler frequency component corresponding to the second region.

3. The detection device according to claim 2, wherein
   the processing circuitry further comprises, for each Doppler frequency component, a suppression processor that has a first Doppler frequency component suppressor to suppress the portion of the Doppler frequency component corresponding to the first region and a second Doppler frequency component suppressor to suppress the Doppler frequency component representing clutter out of the portion of the Doppler frequency component corresponding to the second region, and the processing circuitry is further configured to assign a segment of the first region and the second region to each of the suppression processors.

4. The detection device according to claim 2, wherein the processing circuitry further comprises, for each Doppler frequency component, a suppression processor with a region identification function for identifying the first region and the second region individually, a first Doppler frequency component suppressor to suppress the portion of the Doppler frequency component corresponding to the first region, and a second Doppler frequency component suppressor, to suppress the Doppler frequency component representing clutter out of the portion of the Doppler frequency component corresponding to the second region.

5. The detection device according to claim 2, wherein the processing circuitry is further configured to suppress a Doppler frequency component representing clutter for Doppler frequency components other than a Doppler frequency component corresponding to the relative speed of a large target with respect to a ship having the detection device.

6. The detection device according to claim 2, wherein the processing circuitry is further configured to assign a segment of the first region and the second region for suppression for a Doppler frequency component corresponding to the relative speed of a large target with respect to a ship having the detection device, and the processing circuitry is further configured to suppress a Doppler frequency component representing clutter for Doppler frequency components other than the Doppler frequency component corresponding to the relative speed of a large target with respect to the ship.

7. The detection device according to claim 1, wherein the processing circuitry is further configured to perform CFAR processing on the value of the Doppler frequency component.

8. The detection device according to claim 1, wherein the processing circuitry is further configured to detect a farthest position of the first region when the amplitude level of the reception signal is below the amplitude level of the reception signal at a nearest position of the first region.

9. The detection device according to claim 1, wherein the Doppler frequency component includes a plurality of components.

10. A radar device, comprising:
an antenna rotatable at a specific rotation period;
a transmitter configured to transmit a transmission signal from the antenna at a repetition period that is shorter than the rotation period; and
the detection device according to claim 1, which receives as the reflection signal the signal received by the antenna.

11. A detection method for detecting a target based on a reception signal obtained from the reflection signal of a transmission signal, the method comprising:
acquiring at least one Doppler frequency component that indicates the amplitude level of a reception signal, for at least one Doppler frequency, based on the reception signal;
inputting the Doppler frequency component to a first filter and a second filter having mutually different time constants to identify a first region and a second region other than the first region, based on reception signal, and to detect an edge of the first region when a difference value between output levels of the first filter and the second filter for the reception signal is over a threshold;
suppressing a Doppler frequency component representing clutter, out of a portion of the Doppler frequency component corresponding to the second region, to form a decluttered portion of the Doppler frequency component corresponding to the second region; and
combining the reception signal corresponding to the first region and the decluttered portion of the Doppler frequency component corresponding to the second region.

12. The detection method according to claim 11, further comprising
suppressing a portion of the Doppler frequency component corresponding to the first region less than the suppression for the second region,
the combining further including combining the suppressed portion of the Doppler frequency component corresponding to the first region with the suppressed Doppler frequency component representing clutter out of the portion of the Doppler frequency component corresponding to the second region.

13. The detection method according to claim 11, wherein the suppressing further includes using a CFAR processor for the CFAR processing on the value of the Doppler frequency component.

14. The detection method according to claim 11, wherein the Doppler frequency component includes a plurality of components.

15. The detection method according to claim 11, wherein the identifying further includes detecting a farthest position of the first region when the amplitude level of the reception signal is below the amplitude level of the reception signal at a nearest position of the first region.

16. A non-transitory computer readable medium storing a detection program for causing a computer to execute detection to detect a target based on a reception signal obtained from the reflection signal of a transmission signal, the detection program causing the computer to execute:
Doppler frequency component generation processing to acquire at least one Doppler frequency component that indicates the amplitude level of a reception signal, for at least one Doppler frequency, based on the reception signal;
region identification processing of the Doppler frequency component by a first filter and a second filter having mutually different time constants to identify a first region and a second region other than the first region, based on the reception signal and to detect an edge of the first region when a difference value between output levels of the first filter and the second filter for the reception signal is over a threshold;
second Doppler frequency component suppression processing to suppress the Doppler frequency component of clutter, out of the Doppler frequency component corresponding to the second region, to form a decluttered portion of the Doppler frequency component corresponding to the second region; and
combination processing to combine the reception signal corresponding to the first region and the decluttered portion of the Doppler frequency component corresponding to the second region.

17. The non-transitory computer readable medium according to claim 16, wherein
- the detection program further causes the computer to execute first Doppler frequency component suppression processing to suppress a portion of the Doppler frequency component corresponding to the first region less than the suppression for the second region, and
- the combination processing further includes combining the suppressed portion of the Doppler frequency component corresponding to the first region with the suppressed Doppler frequency component representing clutter out of the portion of the Doppler frequency component corresponding to the second region.

18. The non-transitory computer readable medium according to claim 16, wherein
- the Doppler frequency component suppression processing further includes CFAR processing on the value of the Doppler frequency component.

19. The non-transitory computer readable medium according to claim 16, wherein
- the Doppler frequency component processed by the computer includes a plurality of components.

20. The non-transitory computer readable medium according to claim 16, wherein the region identification processing further includes detecting a farthest position of the first region when the amplitude level of the reception signal is below the amplitude level of the reception signal at a nearest position.

\* \* \* \* \*